(12) United States Patent
Ueno et al.

(10) Patent No.: US 6,460,095 B1
(45) Date of Patent: Oct. 1, 2002

(54) DATA TRANSFER APPARATUS, DATA TRANSFER SYSTEM AND RECORDING MEDIUM

(75) Inventors: Takafumi Ueno, Nara; Junichi Komeno, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/461,299

(22) Filed: Dec. 15, 1999

(30) Foreign Application Priority Data

Dec. 18, 1998 (JP) .......................................... 10-361409
Jun. 16, 1999 (JP) .......................................... 10-170016

(51) Int. Cl.$^7$ ............................................. G06F 13/14
(52) U.S. Cl. ............................. 710/52; 710/12; 710/48; 710/54; 710/68
(58) Field of Search ............................ 710/12, 20, 33, 710/48, 52, 54, 55, 56, 57, 65, 68

(56) References Cited

U.S. PATENT DOCUMENTS

| | | | | |
|---|---|---|---|---|
| 4,528,626 A | * | 7/1985 | Dean et al. .................... | 710/28 |
| 4,761,729 A | * | 8/1988 | Brion ........................... | 710/66 |
| 5,387,942 A | | 2/1995 | Lemelson | |
| 5,617,118 A | | 4/1997 | Thompson | |
| 5,630,043 A | | 5/1997 | Uhlin | |
| 5,692,211 A | | 11/1997 | Gulick et al. | |
| 5,784,650 A | | 7/1998 | Gulick et al. | |
| 5,805,845 A | | 9/1998 | Gulick | |
| 5,977,469 A | * | 11/1999 | Smith et al. .................. | 84/627 |

FOREIGN PATENT DOCUMENTS

| | | |
|---|---|---|
| EP | 0247317 | 12/1987 |
| EP | 0641131 | 1/1995 |
| EP | 0661881 | 5/1995 |
| EP | 0711047 | 8/1996 |
| EP | 0817484 | 7/1998 |
| EP | 0874503 | 10/1998 |
| WO | WO 96 25703 | 8/1996 |
| WO | WO 98 31147 | 7/1998 |

OTHER PUBLICATIONS

Article entitled "Method for Multimedia Non-Repudiation in Computer Networks" (pp. 297–298) from IBM Technical Disclosure Bulletin dated Apr. 1992.
Article entitled "Adding Dynamically Selectable Data Encryption to a Disk Subsystem" (pp. 242–244) from IBM Technical Disclosure Bulletin dated Mar. 1991.
Usuki, Naoshi; "5C Digital Transmission Content Protection: Content Protection for IEEE 1394 High Performance Serial Bus" ITE Technical Report, vol. 22, No. 65, (Nov. 20, 1998) pp. 37–42. (Untranslated).
JP Laid–open H 1–271861 Abstract and English Abstract.
JP Laid–open H10–040172 Abstract and English Abstract.
Open Design, No. 7, Chapter 1 and partial translation.
ITE Technical Report vol. 22, No. 65 "5C Digital Transmission Content Protection", pp. 37–42 and partial translation.

* cited by examiner

Primary Examiner—Jeffrey Gaffin
Assistant Examiner—Mohammad O. Farooq
(74) Attorney, Agent, or Firm—Smith, Gambrell & Russell, LLP

(57) ABSTRACT

A data transfer apparatus and a data transfer system intended to transfer data continuously input or output to/from a main memory without any interruption and to transfer continuous data on a general-purpose bus such as a PCI bus, and a recording medium storing a program that commands a computer to execute all or some of functions of each component of the data transfer apparatus or the data transfer system. If it is supposed that a capacity of a write buffer memory 4 is CAPW, an input rate of continuously input data is T1, and a maximum assumed value of an interval of bus access permissions issued by a CPU 1 is TW, data omissions can be prevented by setting CAPW, T1 and TW at values that satisfy: CAPW≧TW×T1

40 Claims, 15 Drawing Sheets

DATA TRANSFER APPARATUS, DATA TRANSFER SYSTEM AND RECORDING MEDIUM

BACKGROUND OF THE INVENTION

1. Field of the Invention

The present invention relates to a data transfer apparatus and a data transfer system intended to transfer data continuously input or output to/from a main memory without any omission. In particular, the present invention relates to a data transfer apparatus and a data transfer system that transfer continuous data on a general-purpose bus such as a PCI bus. The present invention also relates to a recording medium storing a program that commands a computer to execute all or some of functions of each component of the data transfer apparatus or data transfer system.

2. Description of the Prior Art

As a conventional system that transfers data input/output to/from external devices with a main memory connected to a system bus, a PCI bus used by a personal computer is known (OPEN DESIGN No. 7 "Details of PCI Bus and Steps for its Applications" CQ Publishing Co., Ltd.).

FIG. 15 shows a system block diagram of the PCI bus and with reference now to the attached drawings a data transfer example of the PCI bus will be explained below.

In FIG. 15, 101 is a central processing unit (hereinafter referred to as "CPU"), 102 is a main memory and 103 is a memory controller that controls the main memory 102, and these are connected by a host bus 104. 105 is a host PCI bridge, 106 is an I/O device, 107 is a PCI board having a device that allows data input/output to/from external devices, 109 is an extended bus bridge and 108 is a PCI bus that connects these. 110 is a PCI bus controller that controls the PCI bus, 111 is a buffer memory that stores input data temporarily and 112 is a buffer controller.

When data is input from the input terminal of a PCI board 107, the data is temporarily stored in a buffer memory 111. The amount of data stored in the buffer memory 111 is controlled by a buffer controller 112 and if a predetermined amount of data is reached, a transfer request is issued to the PCI bus controller 110. After receiving the transfer request from the buffer controller 112, the PCI bus controller 110 issues a bus access request signal onto the PCI bus 108. The bus access request signal is transmitted to the host PCI bridge 105 and enables the PCI board 107 to access the PCI bus 108 if there is no access request from other PCI boards. Given the access right, the PCI bus controller 110 issues a transfer enable to the buffer controller 112 and immediately starts a data transfer from the buffer memory 111. The data transferred from the PCI board 107 is temporarily stored in the host PCI bridge 105 and stored in the main memory 102 through the host bus 104 and the memory controller 103.

As shown above, the conventional example above with the buffer memory 111 can temporarily store data input from external devices until the right of access to the PCI bus 108 is given and transfer all data to the main memory 102 without any omission. The data stored in the main memory 102 is transformed to various formats by the CPU 101.

In a personal computer, an add-on card and mother board are connected by a communication path, which is a so-called computer bus such as PCI interface, and the electrical characteristics and the signal format of a computer bus are often made open to general public, which originates great problems such as illegal copies of digital information transmitted through the above computer bus and subsequent data alteration.

BRIEF SUMMARY OF THE INVENTION

Object of the Invention

However, performing a continuous input/output data transfer between external devices and the main memory on the conventional PCI bus involves the following problems:

First, various kinds of PCI boards are connected to the PCI bus 108, each PCI board issues a request for access to the PCI bus 108 at irregular time intervals and transfers data of undefined lengths, which makes irregular intervals at which access to the PCI bus 108 is permitted. If it occurs frequently that the access enable issuance time interval exceeds the value obtained by dividing the capacity of the buffer memory 111 by the transfer rate of continuously input/output data, then the continuously input/output data will overwrite (when input to the main memory 102) on the buffer memory 111, resulting in data omissions or the buffer memory 111 becoming empty (when output from main memory 102) leading to an empty transfer.

Moreover, since the PCI bus 108 is a general-purpose bus, if data input is video/voice data, the PCI bus 108 easily allows other PCI boards or I/O devices to incorporate the input data, which causes another problem of easily allowing illegal copies.

The present invention has taken into account the problems above of the conventional PCI bus transfer system and it is an objective of the present invention to provide a data transfer apparatus and data transfer system capable of preventing continuously input/output data from being interrupted even if bus access enable issuance time intervals become irregular.

SUMMARY OF THE INVENTION

The 1st invention of the present invention is a data transfer apparatus temporarily storing continuously input data and transmitting the input data to a transfer destination according to an input enable signal issued by said transfer destination through a first bus, comprising:

an input buffer memory that temporarily stores said continuously input data;

a transfer controller, connected with said transfer destination through said first bus, that acquires said input enable signal through said first bus and transmits said temporarily stored input data output from said input buffer memory to said transfer destination through said first bus;

a second bus that performs data transfer between said input buffer memory and said transfer controller; and a buffer controller that controls the output of said input buffer memory according to said input enable signal, wherein said input buffer memory capacity CAPW satisfies the following Mathematical formula 1, where the input rate of said continuously input data is T1 and the maximum assumed value of the transmission time interval of said input enable signal issued by said transfer destination is TW:

$$CAPW \geq TW \times T1 \qquad \text{[Mathematical formula 1]}$$

The 2nd invention of the present invention is a data transfer apparatus temporarily storing output data transmitted from a transfer destination through a first bus according to an output enable signal issued by said transfer destination and continuously outputs the data, comprising:

a transfer controller connected with said transfer destination through said first bus that acquires said output enable signal and said transmitted output data through said first bus;

an output buffer memory that temporarily stores and continuously outputs said transmitted output data;

a second bus that performs data transfer between said output buffer memory and said transfer controller; and a buffer controller that controls the input to said output buffer memory according to said output enable signal, wherein said output buffer memory capacity CAPR satisfies the following Mathematical formula 2, where the output rate of said continuously output data is T2 and the maximum assumed value of the transmission time interval of said output enable signal issued by said transfer destination is TR:

$$CAPR \geqq TR \times T2 \qquad \text{[Mathematical formula 2]}$$

The 3rd invention of the present invention is a data transfer apparatus temporarily storing continuously input data, transmitting the input data to a transfer destination through a first bus according to an input enable signal issued by said transfer destination and temporarily storing output data transmitted from said transfer destination through the first bus according to an output enable signal issued by said transfer destination and continuously outputs the output data, comprising:

an input buffer memory that temporarily stores said continuously input data;

an output buffer memory that temporarily stores and continuously outputs said transmitted output data;

a transfer controller, connected with said transfer destination through said first bus, that acquires said input enable signal, said output enable signal and said transmitted output data through said first bus, transmits said temporarily stored input data output from said input buffer memory to said transfer destination through said first bus and transmits said output data to said output buffer memory through said first bus;

a second bus that performs data transfer between said input buffer memory, said output buffer memory and said transfer controller; and a buffer controller that controls the output of said input buffer memory according to said input enable signal and controls the input to said output buffer memory according to said output enable signal, wherein said input buffer memory capacity CAPW satisfies the following Mathematical formula 1, where, the input rate of said continuously input data is T1 and the maximum assumed value of the transmission time interval of said input enable signal issued by said transfer destination is TW; and said output buffer memory capacity CAPR satisfies the following Mathematical formula 2, where the output rate of said continuously output data is T2 and the maximum assumed value of the transmission time interval of said output enable signal issued by said transfer destination is TR:

$$CAPW \geqq TW \times T1 \qquad \text{[Mathematical formula 1]}$$

$$CAPR \geqq TR \times T2 \qquad \text{[Mathematical formula 2]}$$

The 4th invention of the present invention is the data transfer apparatus according to said the 1st or 3rd inventions, further comprising transfer control means on the apparatus side that detects whether said input data contains a predetermined protection signal, extracts the protection signal and enables transmission to said transfer destination according to the presence/absence of said protection signal or said protection signal.

The 5th invention of the present invention is the data transfer apparatus according to any one of said the 1st, 3rd and 4th inventions, further comprising encryption,means that detects whether said input data contains a predetermined protection signal and if said input data contains said predetermined protection signal, encrypts said input data and transmits the encrypted input data to said transfer destination.

The 6th invention of the present invention is the data transfer apparatus according to said the 4th or 5th inventions, further comprising authentication means that, if authentication of said data transfer destination is considered necessary, said authentication is performed.

The 7th invention of the present invention is the data transfer apparatus according to said the 4th, 5th or 6th inventions, comprising said transfer controller that transmits not only,data obtained by encrypting said input data, but also encryption mode information without encryption set according to said protection signal.

The 8th invention of present invention is the data transfer apparatus according to said the 5th, 6th or 7th inventions, further comprising encryption means in which said input data is multiplexed data obtained by multiplexing a plurality of programs in a packet, selectively encrypted for every said programs and transmitted to said transfer destination.

The 9th invention of the present invention is the data transfer apparatus according to said the 8th invention comprising said transfer controller that transmits packet identifiers to identify said plurality of programs without encryption to said transfer destination.

The 10th invention of the present invention is the data transfer apparatus according to said the 8th or 9th inventions, comprising said transfer controller that transmits data with said encryption mode information for every said programs of said multiplexed packet data.

The 11th invention of the present invention is a data transfer system comprising:

a data transfer apparatus according to one of said the 1st to 10th inventions;

a main memory and a central processing unit that controls the main memory comprising said transfer destination; and a transfer bus, which is said first bus.

The 12th invention of the present invention is the data transfer system according to said the 11th invention, wherein said central processing unit sets the transfer size corresponding to said input enable signal in such a way that said input buffer memory becomes empty when a transfer is completed and/or sets the transfer size corresponding to said output enable signal in such a way that said output buffer memory is left without empty space when the transfer is completed.

The 13th invention of the present invention is the data transfer system according to said the 11th or 12th inventions, wherein said data transfer apparatus is the data transfer apparatus according to said the 3rd invention and comprises transfer control-means that switches between said input data transfer and said output data transfer by means of time division according to a relationship between said input buffer memory capacity, said input rate, capacity of said output buffer memory and said output rate, and said input enable signal and said output enable signal are issued according to switching performed by said transfer control means.

The 14th invention of the present invention is the data transfer system according to said the 11th, 12th or 13th inventions, wherein said data transfer apparatus is the data transfer apparatus according to said the 2nd or 3rd inventions, and
- if said output data is obtained by separating video/voice multiplexed data into a continuous video data group, which is a group of continuous video data and a continuous voice data group, which is a group of continuous voice data,
- said continuous video data group and said continuous voice data group, which are mutually corresponding to each other, are transmitted in response to said two output enable signals issued one after the other, respectively,
- the transfer timings of said two output enable signals are determined by the transfer control means in such a way that said continuous video data group and said continuous voice data group, which are mutually corresponding to each other, are output from said output buffer memory continuously.

The 15th invention of the present invention is the data transfer system according to any one of said the 11th to 14th inventions, wherein said data transfer apparatus is the data transfer apparatus according to said the 2nd or 3rd and comprises transfer control means on the transfer destination side that detects whether said output data contains a predetermined protection signal and enables transmission to said data transfer apparatus according to said protection signal.

The 16th invention of the present invention is the data transfer system according to said the 11th, 12th, 13th or 14th inventions, wherein said data transfer apparatus is the data transfer apparatus according to said the 2nd or 3rd inventions, comprising transfer control means on the transfer destination side that, if said output data is encrypted, detects whether said output data contains predetermined encryption mode information or not, carries out authentication on said data transfer apparatus according to said encryption mode information and enables transmission to said data transfer apparatus only when said data transfer apparatus is authenticated.

The 17th invention of the present invention is the data transfer apparatus according to said the 2nd inventions, further comprising, authentication means that if said output data is encrypted and contains predetermined encryption mode information carries out necessary authentication on said transfer destination according to said predetermined encryption mode information and decryption means that decrypts said encrypted output data.

The 18th invention of the present invention,is the data transfer apparatus according to said the 17th invention, comprising, authentication means that if said output data contains multiplexed data made up of a plurality of programs multiplexed into packets and then encrypted and predetermined encryption mode information carries out necessary authentication on said transfer destination according to said predetermined encryption mode information and decryption means that selectively decrypts said encrypted output data for every said program.

The 19th invention of the present invention is a program recording medium storing a program that commands a computer to execute all or some of functions demonstrated by each means or each component of the data transfer apparatus or data transfer system according to one of said the 1st to 18th inventions.

DESCRIPTION OF SYMBOLS

| | |
|---|---|
| 1 | CENTRAL PROCESSING UNIT (CPU) |
| 2 | MAIN MEMORY |
| 3 | TRANSFER CONTROLLER |
| 4 | WRITE BUFFER MEMORY |
| 5 | WRITE BUFFER CONTROLLER |
| 6 | TRANSFER SIZE REGISTER |
| 7 | READ COUNTER |
| 8 | READ COMPARATOR |
| 9 | WRITE COUNTER |
| 10 | SUBTRACTOR |
| 11 | AND CIRCUIT |
| 12 | RESIDUAL AMOUNT COMPARATOR |
| 18 | MULTI-BUS |
| 19 | INPUT DATA BUS |
| 20 | MAIN MEMORY CONTROLLER |
| 21 | READ BUFFER MEMORY |
| 22 | READ BUFFER CONTROLLER |
| 23 | RESIDUAL AMOUNT COUNTER |
| 24 | OUTPUT DATA BUS |
| 25 | WRITE COMPARATOR |
| 26 | ADDER |
| 28 | RESIDUAL AMOUNT COMPARATOR |
| 40 | BUFFER CONTROLLER |
| 41 | BIDIRECTIONAL DATA BUS |
| 42 | TRANSFER ENABLE SWITCHING CIRCUIT |

-continued

| 43 | VIDEO/VOICE DEMULTIPLEXER |
| 44 | PROTECTION SIGNAL DETECTION CIRCUIT |
| 45 | TRANSFER CONTROL CIRCUIT |
| 50 | FIRST ENCRYPTION CIRCUIT |
| 51 | FIRST AUTHENTICATION CIRCUIT |
| 201 | SECOND AUTHENTICATION CIRCUIT |
| 501 | SECOND ENCRYPTION CIRCUIT |

DETAILED DESCRIPTION OF THE PREFERRED EMBODIMENTS

With reference now to FIG. 1 to FIG. 14, the embodiments of the present invention will be explained below.

Embodiment 1

Figure 1:
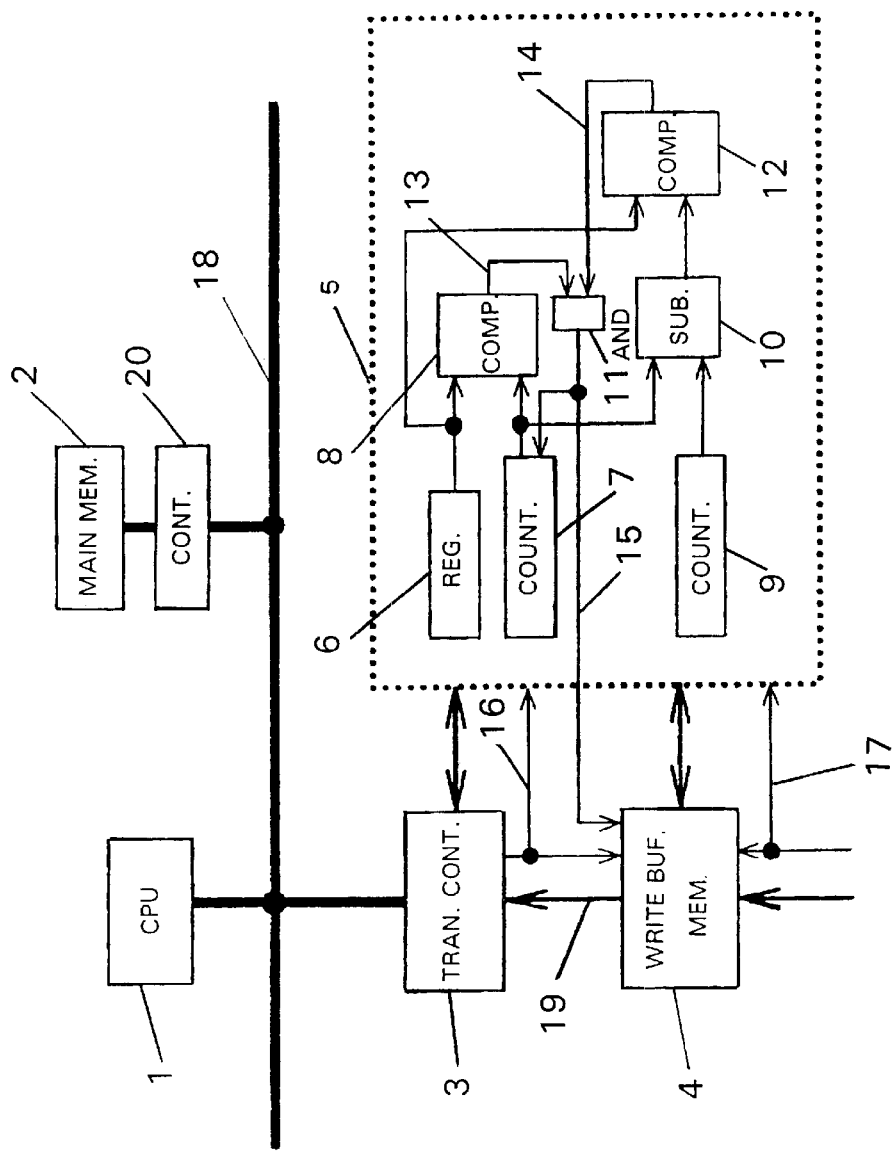
FIG. 1 is a block diagram showing an outlined configuration of a data transfer apparatus and data transfer system in Embodiment 1 of the present invention.

FIG. 1 is a block diagram showing an outlined configuration of a data transfer apparatus and data transfer system according to Embodiment 1 of the present invention.

In FIG. 1, 1 is a central processing unit (hereinafter referred to as "CPU"), 2 is a main memory and 3 is a transfer controller. 20 is a main memory controller that controls main memory 2. CPU 1, the main memory controller 20 and the transfer controller 3 are mutually connected via a multi-bus 18 (corresponding to the "first bus" of the present invention). 4 is first-in-first-out write buffer memory (corresponding to the "input buffer memory" of the present invention) and is connected via transfer controller 3 and an input data bus 19 (corresponding to the "second bus" of the present invention). 5 is a write buffer controller (corresponding to the "buffer controller" of the present invention) and controls the write buffer memory 4. 6 is a transfer size register; 7, a read counter; 8, a read comparator; 9, a write counter that controls the amount of data input to the write buffer memory 4. 10 is a subtractor that counts the amount of data stored in the write buffer memory 4. 11 is an AND circuit and 12 is a residual amount comparator. 13 is output signal ENB_A of read comparator 8 and 14 is output signal ENB_B of residual amount comparator 12. 15 is read enable, 16 is a read clock and 17 is a write clock and these are connected to the write buffer memory 4. The transfer controller 3, input data bus 19, the write buffer memory 4 and the write buffer controller 5 configure the data transfer apparatus in the present embodiment. The CPU 1, the main memory 2 and the main memory controller 20 correspond to a "transfer destination" of the present invention.

The operation of the data transfer apparatus and data transfer system of the present embodiment as configured above will be explained below.

Input data is written to the write buffer memory 4 in synchronization with the write clock 17. This input data is input continuously, and thus written to the write buffer memory 4 continuously. The write counter 9 counts the amount of data written to the write buffer memory 4 by incrementing the count value every time write clock 17 is input. A transfer enable (corresponding to the "input enable signal" of the present invention) for the main memory 2 corresponding to the data written to the write buffer memory 4 is issued from the CPU 1. The CPU 1 issues to the main memory controller 20 a command to secure in the main memory 2 an area to store data transferred from the write buffer memory 4, and after securing the area, sends a transfer enable, transfer size and the address of the main memory 2, which is the transfer destination, to the transfer controller 3. After receiving the transfer enable, the transfer controller 3 sets the transfer size in the transfer size register 6 of the write buffer controller 5. When the transfer size is set, the write buffer controller 5 judges, through the residual amount comparator 12, whether the amount of data stored in the write buffer memory 4 is greater than the transfer size value. The residual amount comparator 12 always compares the value set in transfer size register 6 and the calculated value of the subtractor 10. The subtractor 10 subtracts the value output from the read counter 7 from the value output from the write counter 9, and therefore the calculated value indicates the amount of residual data stored in the write buffer memory 4.

If the residual amount comparator 12 judges that the amount of data stored in the write buffer memory 4 is greater than the transfer size value, ENB_B becomes active and since ENB_A is active at this time, the read enable 15 which is the output of AND circuit 11 becomes active, and a data read from the write buffer memory 4 starts and at the same time the read counter 7 also starts counting the read data count. The data read from the write buffer memory 4 is temporarily stored in a buffer in the transfer controller 3 in synchronization with the read clock 16 via the input data bus 19, and after the storage, the transfer controller 3 issues an access request to the multi-bus 18. After acquiring the access right, the transfer controller 3 sends the address of the main memory 2, write command and data to the main memory controller 20 via the multi-bus 18 and the data is written to the main memory 2.

Every time data is output from the write buffer memory 4, the read counter 7 increments the counter value in synchronization with the read clock 16 and informs this counter value to the read comparator 8. The read comparator 8 compares the counter value above with the value indicated by the transfer size register 6 and judges whether the data corresponding to the transfer size has been read or not. If the data corresponding to the transfer size is transferred from the write buffer memory 4, ENB_A becomes non-active, and therefore read enable 15 becomes non-active and the data transfer is stopped.

CPU 1 again secures in the main memory 2 the area to store data transferred from the write buffer memory 4 and when a transfer enable, transfer size and the address of the main memory 2, which is the transfer destination, are sent to the transfer controller 3, the above operation is repeated.

The capacity of the write buffer memory 4 is a value equal to or greater than the value obtained by multiplying the transfer rate of the input data (corresponding to the "input rate" of the present invention) by the maximum interval at which CPU 1 issues transfer enables and this value can be implemented by Mathematical formula 1 below.

$$CAPW \geq TW \times TI \qquad \text{[Mathematical formula 1]}$$

where, CAPW is the capacity of the write buffer memory 4, TW is the transfer rate of input data, and TI is the maximum interval at which the CPU 1 issues transfer enables. For example, when TW is 4 Mbytes/s and TI is 10 ms, the capacity of write buffer memory 4 is as shown by Mathematical formula 3 below.

$$CAPW \geq 40 \ [Kbytes] \qquad \text{[Mathematical formula 3]}$$

When the CPU 1 allows processing other than a data transfer or a transfer from another transfer controller, the interval at which the CPU 1 issues transfer enables may change every time. However, since in the data transfer apparatus and data transfer system of the present embodiment, the capacity of the write buffer memory 4 is equal to or greater than the value obtained by multiplying the transfer rate of input data by the maximum interval at which the CPU 1 issues transfer enables, it is possible to prevent continuously input data from overwriting on the write buffer memory 4 even if the interval at which the CPU 1 issues transfer enables may change every time. That is, when implementing the data transfer above, the present embodiment can transfer the input data to the main memory 2 suppressing omissions thereof compared to the conventional apparatus.

Furthermore; in the data transfer apparatus and data transfer system of the present embodiment, the CPU 1 can set the transfer size corresponding to a transfer enable so that the write buffer memory 4 becomes empty when the transfer is completed, thus completely preventing continuously input data from overwriting on the write buffer memory 4 even if the interval at which the CPU 1 issues transfer enables may change every time except external causes such as errors. That is, when implementing the data transfer above, the present embodiment can transfer the input data to the main memory 2 suppressing omissions thereof.

Meanwhile, the buffer controller of the present invention in the present embodiment was explained as controlling the output of the input buffer memory of the present invention by comprising residual amount comparator 12, etc., but the buffer controller of the present invention is not limited to this and needs only to control the output of the input buffer memory according to the input enable signal of the present invention at least.

Furthermore, the transfer controller of the present invention in the present embodiment was explained as having a buffer that temporarily stores the output from the write buffer memory 4, but since the above buffer exists for conversion so that data is carried onto multi-bus 18, and if such conversion is not necessary, the transfer controller of the present invention need not have the buffer above.

Embodiment 2

Figure 2:
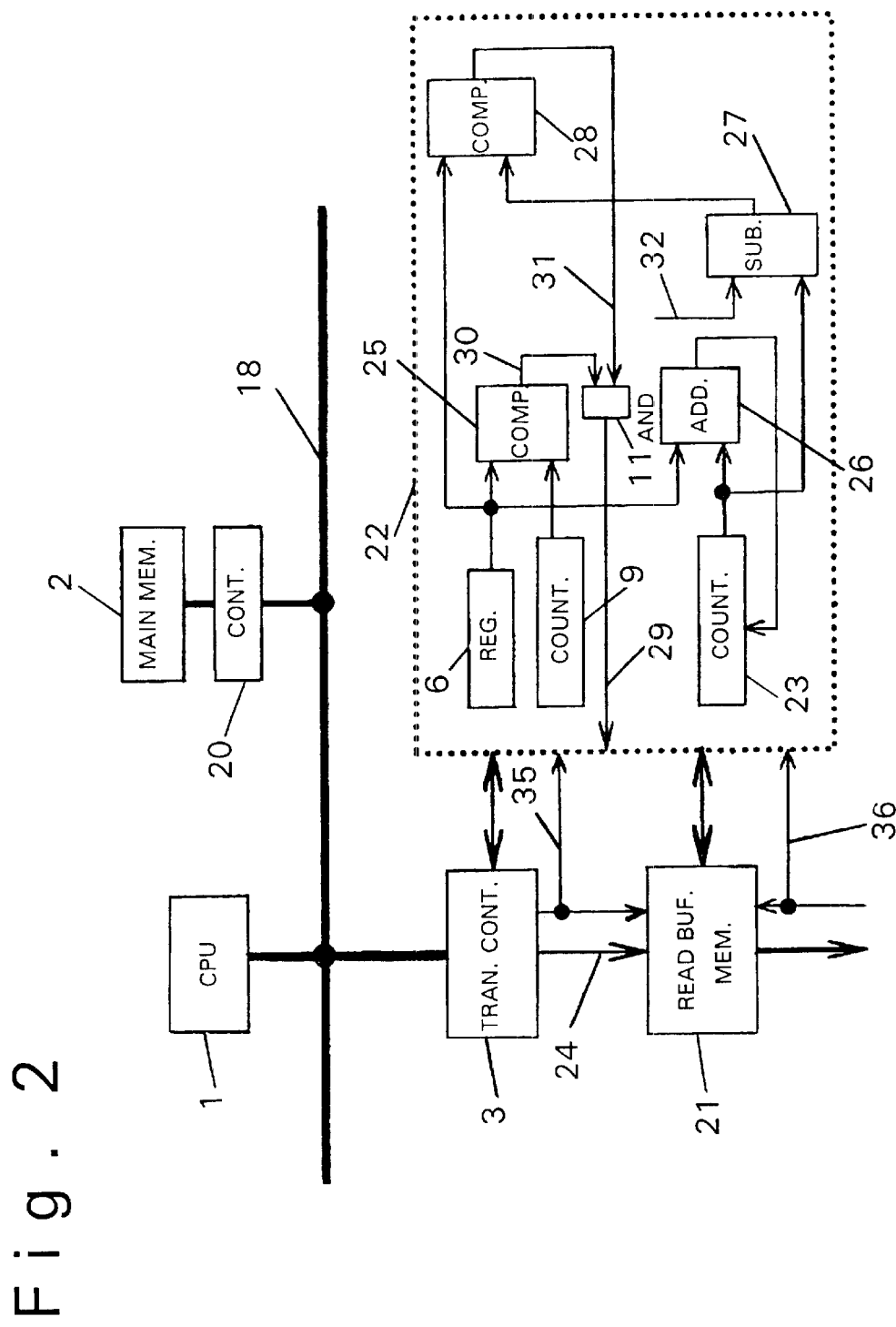
FIG. 2 is a block diagram showing an outlined configuration of a data transfer apparatus and data transfer system in Embodiment 2 of the present invention.

FIG. 2 is a block diagram showing an outlined configuration of a data transfer apparatus and data transfer system according to Embodiment 2 of the present invention. While the data transfer apparatus in Embodiment 1 performs data transfers to the transfer destination, the data transfer apparatus of the present embodiment performs data transfers from the transfer destination. However, the transfer destination is the same as that in Embodiment 1. Therefore, the parts not especially specified in the present embodiment are assumed to be the same as those in Embodiment 1 and the components assigned the same numeral as those in Embodiment 1 are assumed to have the same functions as those in Embodiment 1 unless specified otherwise.

In FIG. 2, reference numeral 21 is a first-in-first-out read buffer memory (corresponding to the "output buffer memory" of the present invention) and is connected to a transfer controller 3 via an output data bus 24 (corresponding to the "second bus" of the present invention). Reference numeral 22 is a read buffer controller (corresponding to the "buffer controller" of the present invention) and controls a read buffer memory 21. Reference numeral 6 is a transfer size register; 9, a write counter; 25, a write comparator; 23, a residual amount counter that controls the amount of data output from the read buffer memory 21. Reference numeral 27 is a subtractor that counts the amount of free space in the read buffer memory 21. Reference numeral 26 is an adder and adds up the value output from the residual amount counter 23 and the value of the transfer size register 6 and sets the result as the initial value of the residual amount counter 23. Reference numeral 11 is an AND circuit and 28 is a free space comparator. Reference numeral 3 is an output signal ENB_C of the write comparator 25 and 31 is an output signal ENB_D of the free residual amount comparator 28. Reference numeral 29 is write enable, 35 is a write clock and 36 is a read clock and these are connected to the read buffer memory 21. Reference numeral 32 is the capacity value of the read buffer memory 21. The transfer controller 3, output data bus 24, read buffer memory 21 and read buffer controller 22 configure the data transfer apparatus in the present embodiment. As in the case of Embodiment 1, the CPU 1, main memory 2 and main memory controller 20 correspond to the "transfer destination" of the present invention.

The operation of the data transfer apparatus and data transfer system of the present embodiment as configured above will be explained below.

When the data in the main memory 2 is ready to be transferred to the read buffer memory 21, the CPU 1 sends a transfer enable (corresponding to the "output enable signal" of the present invention), transfer size and the address of the main memory 2, which is a transfer source, to the transfer controller 3. After receiving the transfer enable, the transfer controller 3 sets the transfer size in the transfer size register 6 of the read buffer controller 22. When the transfer size is set, the read buffer controller 22 judges, through the free space comparator 28, whether the free space of the read buffer memory 21 is greater than the transfer size value or not. The free space comparator 28 always compares the value set in the transfer size register 6 and the calculated value of the subtractor 27. The subtractor 27 subtracts the value output from the residual amount counter 23 from the capacity value of the read buffer memory 21, and therefore the calculated value indicates the amount of free space in the read buffer memory 21.

If the free space comparator 28 judges that the free space in the read buffer memory 21 is greater than the transfer size value, the ENB_D becomes active and since the ENB_C is active at this time, the write enable 29, which is the output of the AND circuit 11, becomes active, and after receiving this result the transfer controller 3 issues an access request to a multi-bus 18. After acquiring the access right for this access request, the transfer controller 3 sends the address of the main memory 2 and a read command to the main memory controller 20 via the multi-bus 18. After receiving the address and read command, the main memory controller 20 transfers data from the main memory 2 to the transfer controller 3. The read data is temporarily stored in a buffer in the transfer controller 3 and written to the read buffer memory 21 in synchronization with the write clock 35 via the output data bus 24. Concurrently with the start of a data write to the read buffer memory 21, the write counter 9 also starts counting the amount of write data. The write counter 9 increments the counter value in synchronization with the write clock 35 while the data is in put to the read buffer memory 21 and sends the result to the write comparator 25. The write comparator 25 compares the result with the value indicated by the transfer size register 6 and judges whether the data corresponding to the transfer size has been read or not. If the data corresponding to the transfer size is transferred to the read buffer memory 21, the ENB_C becomes non-active, and therefore the write enable 29 becomes non-active and the data transfer is stopped. After the data transfer is stopped, the adder 26 adds up the transfer size and the value indicated by the residual amount counter 23 and the addition result is set as the initial value for the residual amount counter 23.

Data is continuously output from the read buffer memory 21 in synchronization with the read clock 36. The residual amount counter 23 controls the amount of data remaining in the read buffer memory 21 by decrementing the count value every time the read clock 36 is input.

When data in the main memory 2 is ready to be transferred to the read buffer memory 21 again, the CPU 1 sends a transfer enable, transfer size and the address of the main memory 2, which is the transfer source, to the transfer controller 3, and repeats the above described operation thereafter.

The capacity of the read buffer memory 21 is equal to or greater than the value obtained by multiplying the transfer rate of the output data (corresponding to the "output rate" of the present invention) by the maximum interval at which the CPU 1 issues transfer enables and this value can be implemented by Mathematical formula 2 below.

$$CAPR \geq TR \times T2 \qquad \text{[Mathematical formula 2]}$$

where, CAPR is the capacity of the read buffer memory 21, TR is the transfer rate of output data, and T2 is the maximum interval at which the CPU 1 issues transfer enables. For example, when TR is 3 Mbytes/s and T2 is 15 ms, the capacity of the write buffer memory 4 is as shown by Mathematical formula 4 below.

$$CAPR \geq 45 [\text{K bytes}] \qquad \text{[Mathematical formula 4]}$$

When the CPU 1 allows processing other than a data transfer or a transfer from another transfer controller, the interval at which the CPU 1 issues transfer enables changes every time. However, since in the data transfer apparatus and data transfer system of the present embodiment, the capacity of the read buffer memory 21 is equal to or greater than the value obtained by multiplying the transfer rate of output data by the maximum interval at which the CPU 1 issues transfer enables, it is possible to prevent continuously output data from becoming empty in the read buffer memory 21 even if the interval at which the CPU 1 issues transfer enables may change every time. That is, when implementing the data transfer described above, the present embodiment can transfer data to external devices preventing interruption of output data better than the conventional apparatus.

Furthermore, in the data transfer apparatus and data transfer system of the present embodiment, the CPU 1 can set the transfer size corresponding to a transmission enable so that the read buffer memory 21 is left with no empty space when the transfer is completed, thus completely preventing continuously output data from becoming empty in the read buffer memory 21 even if the interval at which the CPU 1 issues transfer enables may change every time except external causes such as errors. That is, when implementing the data transfer described above, the present embodiment can transfer the output data to external devices without being interrupted.

Meanwhile the buffer controller of the present invention in the present embodiment has been explained as controlling the input of the output buffer memory of the present invention by comprising the residual amount comparator 28, etc., but the buffer controller of the present invention is not limited to this and needs only to control the input of the output buffer memory according to an output enable signal of the present invention at least.

Furthermore, the transfer controller of the present invention in the present embodiment has been explained as having a buffer that temporarily stores data transmitted via the multi-bus 18, but since the buffer exists for conversion so that data carried on the multi-bus 18 is carried onto the output data bus 24, if such conversion is not necessary, the transfer controller of the present invention need not have the buffer.

Embodiment 3

Figure 3:
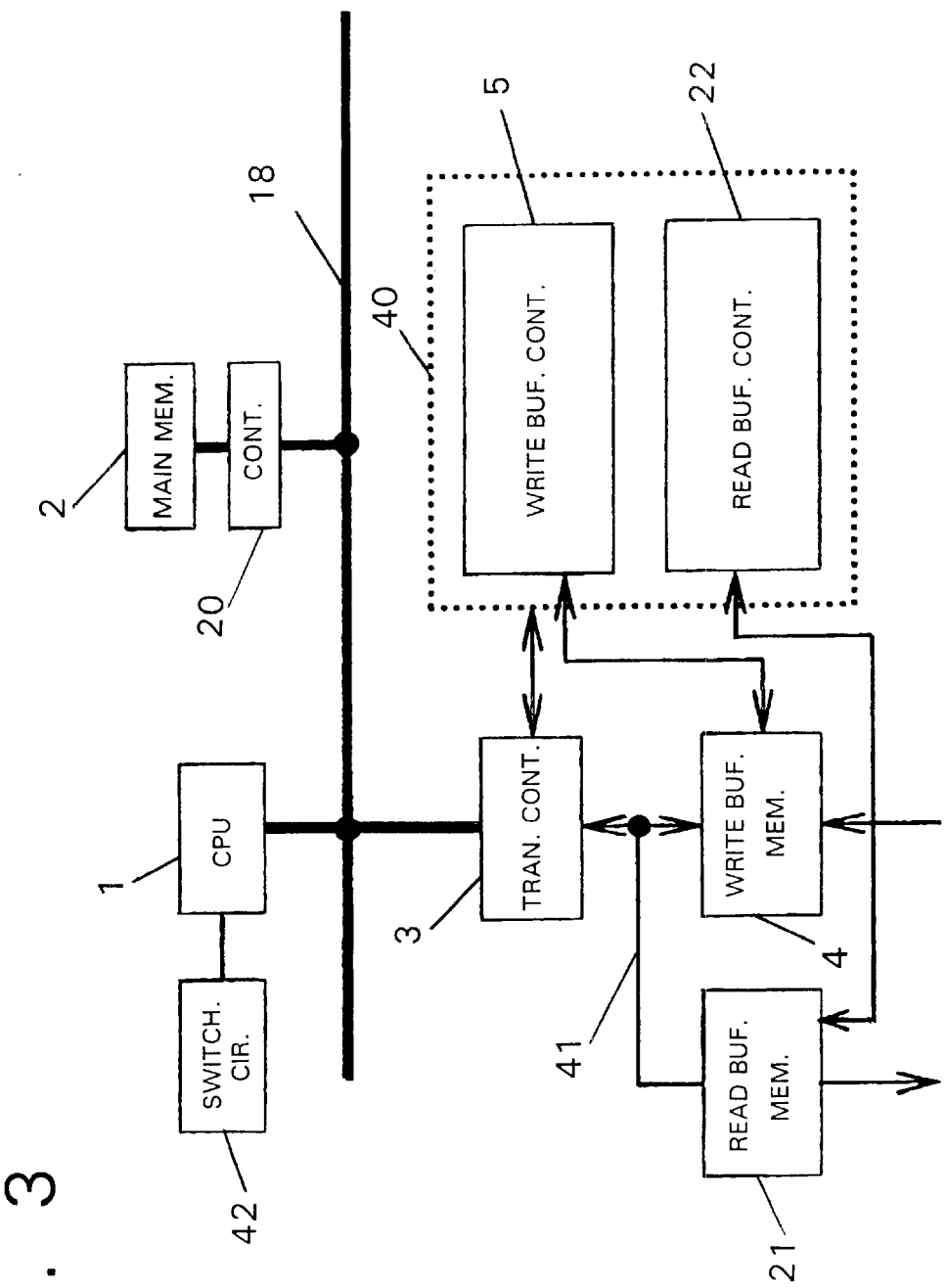
FIG. 3 is a block diagram showing an outlined configuration of a data transfer apparatus and data transfer system in Embodiment 3 of the present invention.

FIG. 3 is a block diagram showing an outlined configuration of a data transfer apparatus and data transfer system according to Embodiment 3 of the present invention. The data transfer apparatus in the present embodiment combines the functions of the data transfer apparatus in Embodiment 1 and the functions of the data transfer apparatus in Embodiment 2. Therefore, the parts not especially specified in the present embodiment are assumed to be the same as those in Embodiments 1 and 2 and the components assigned the same numeral as those in Embodiments 1 and 2 are assumed to have the same functions as those in Embodiments 1 and 2 unless specified otherwise. Furthermore, the modification examples described in Embodiments 1 and 2 are also assumed to be applicable to the present embodiment with similar modifications unless otherwise specified.

In FIG. 3, the write buffer memory 4, read buffer memory 21 and transfer controller 3 are connected via a bidirectional data bus 41. Reference numeral 40 is a buffer controller (corresponding to the "buffer controller" of the present invention) and includes the write buffer controller 5 explained in Embodiment 1 and read buffer controller 22 explained in Embodiment 2, which control the write buffer memory 4 and the read buffer memory 21, respectively. 42 is a transfer enable switching circuit (corresponding to the "transfer control means" of the present invention) and issues a write transfer enable request or read transfer enable request to the CPU 1 in order to switch between a transfer of input data to the main memory 2 (write transfer) and a transfer of output data from the main memory 2 (read transfer) by means of time division.

In the data transfer apparatus and data transfer system in the present embodiment configured as shown above, the operation of switching between a write operation that transfers data input to the write buffer memory 4,to the main memory 2 and a read operation that transfers data from the main memory 2 to the read buffer memory 21 will be explained below.

A write operation that transfers data input to the write buffer memory 4 to the main memory 2 and a read operation that transfers data from the main memory 2 to the read buffer memory 21 are the same as those explained in Embodiments 1 and 2.

The transfer enable switching circuit 42 switches between a write transfer enable (corresponding to the "input enable signal" of the present invention) request and a read transfer enable (corresponding to the "output enable signal" of the present invention) request by means of time division according to the capacity of the write buffer memory 4, transfer rate of write transfer (corresponding to the "input rate" of the present invention), the capacity of the read buffer memory 21 and transfer rate of read transfer (corresponding to the "output rate" of the present invention).

For example, if the transfer rate of a write transfer and the transfer rate of a read transfer are the same, and the capacity of the write buffer memory 4 and the capacity of the read buffer memory 21 are the same, the transfer enable switching circuit 42 issues a read transfer enable request to the CPU 1 after completion of the write operation and issues a write transfer enable request to the CPU 1 after completion of the read operation. That is, the ratio of the timing of issuance of a write transfer enable request to the timing of issuance of a read transfer enable request is set to 1:1. The two transfer enable requests are switched alternately, and therefore there is no such a case where a write operation is performed continuously or a read operation is performed continuously. That is, in addition to the effects obtained from Embodiments 1 and 2, the present embodiment can prevent omissions of continuously input data or interruptions of continuously output data caused by switching between a write transfer and read transfer.

Furthermore, the timing of switching between transfer enable requests can be changed according to the transfer rate of input/output, the capacities of the write/read buffer memories, which allows the present embodiment to be applied to a variety of hardware.

Meanwhile the present embodiment implements the transfer enable switching circuit by hardware, but the present embodiment is not limited to this and can also be implemented by software that operates the CPU 1, for example.

Embodiment 4

Figure 4:
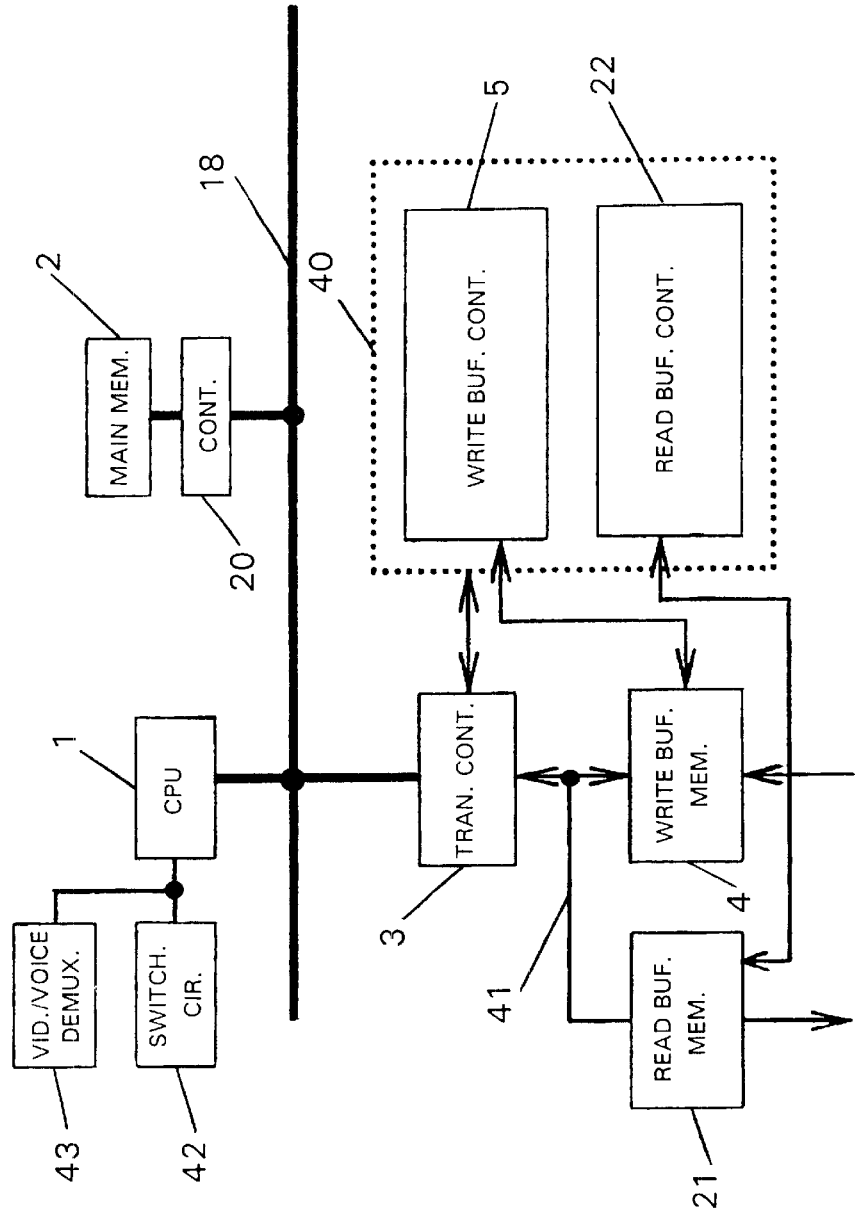
FIG. 4 is a block diagram showing an outlined configuration of a data transfer apparatus and data transfer system in Embodiment 4 of the present invention.

FIG. 4 is a block diagram showing an outlined configuration of a data transfer apparatus and data transfer system according to Embodiment 4 of the present invention. The data transfer system in the present embodiment is the same as the data transfer system in Embodiment 3 except that input data of the present invention is video/voice multiplexed data, the output data of the present invention is obtained by separating the video/voice multiplexed data and the data transfer system is provided with a video/voice demultiplexer 43 to handle the video/voice data. Therefore, the parts not especially specified in the present embodiment are assumed to be the same as those in Embodiment 3 and the components assigned the same numeral as those in Embodiment 3 are assumed to have the same functions as those in Embodiment 3 unless specified otherwise. Furthermore, the modification examples described in Embodiment 3 are also assumed to be applicable to the present embodiment with similar modifications unless otherwise specified.

In FIG. 4, reference numeral 43 is a video/voice demultiplexer that separates the video/voice multiplexed data into continuous video data and continuous voice data.

Regarding the data transfer apparatus and data transfer system of the present embodiment configured as shown above, the operations of video/voice multiplexed data input to the write buffer memory 4 being transferred to the main memory 2 and the video/voice demultiplexer separating this video/voice multiplexed data into video data and voice data and then continuously transferring the video data and voice data from the main memory 2 to the read buffer memory 21 will be explained below.

The input operation of transferring data input to the write buffer memory 4 to the main memory 2 and the output operation of transferring data from the main memory 2 to the read buffer memory 21 are the same as the operations explained in Embodiments 1 and 2.

When video/voice multiplexed data is input onto the multi-bus 18 via the transfer controller 3, etc., the video/voice multiplexed data is temporarily stored in the main memory 2. The stored video/voice multiplexed data is given a video data identification flag and a voice data identification flag. The CPU 1 transfers the video/voice multiplexed data stored in the main memory 2 to the video/voice demultiplexer 43 and video/voice demultiplexer 43 separates the video/voice multiplexed data into continuous video data (corresponding to the "continuous video data group" of the present invention) and continuous voice data (corresponding to the "continuous voice data group" of the present invention) according to the video data identification flag and the voice data identification flag. The separated continuous video data and continuous voice data are again transferred by the CPU 1 to the main memory 2, but the two pieces of data are stored in different areas inside the main memory 2. The ratio between the continuous video data and continuous voice data contained in the video/voice multiplexed data varies on the time series depending on their respective data compression rates. The video/voice demultiplexer 43 calculates the timing of transferring each data piece to the read buffer memory 21 according to the data length of the separated continuous video data or the data length of the continuous voice data and informs the transfer enable switching circuit 42 of the transfer timing. The transfer enable switching circuit 42 issues a transfer enable request of the continuous video data or continuous voice data to the CPU 1 according to the transfer timing described above. After receiving the enable request described above, the CPU 1 sends to the transfer controller 3 the enable for transferring the continuous video data or continuous voice data from the main memory 2 to the read buffer memory 21.

Thus, even after the video/voice multiplexed data is input and then separated into continuous video data and continuous voice data, the video/voice demultiplexer 43 transmits the transfer timing to the transfer enable switching circuit 42, and in this way read operation of neither continuous video data nor continuous voice data is performed continuously. That is, in addition to the effects obtained in Embodiment 3, the present embodiment can prevent interruptions of continuously output data caused by switching between a continuous video data transfer and continuous voice data transfer.

Furthermore, the timing of switching between transfer enable requests can be changed according to the transfer rate of input/output and the capacities of the write/read buffer memories, which allows the present embodiment to be applied to a variety of hardware.

Meanwhile, the present embodiment implements the video/voice demultiplexer and the transfer enable switching circuit by hardware, but the present embodiment is not limited to this and either one or both of these circuits can also be implemented by software that operates the CPU 1.

Furthermore the data transfer system in the present embodiment has been explained as being the same as the data transfer system in Embodiment 3 except that input data of the present invention is the video/voice multiplexed data, the output data-of the present invention is obtained by separating the video/voice multiplexed data and the data transfer system is provided with the video/voice demultiplexer 43 to handle the video/voice data. However, the present embodiment is not limited to this; for example, even if the present embodiment is the same as the data transfer system in Embodiment 2 except that output data of the present invention is video/voice demultiplexed data and the data transfer system is provided with a video/voice demultiplexer to handle the video/voice data, the present embodiment can prevent interruptions of continuously output data caused by switching between a continuous video data transfer and continuous voice data transfer.

Embodiment 5

Figure 5:
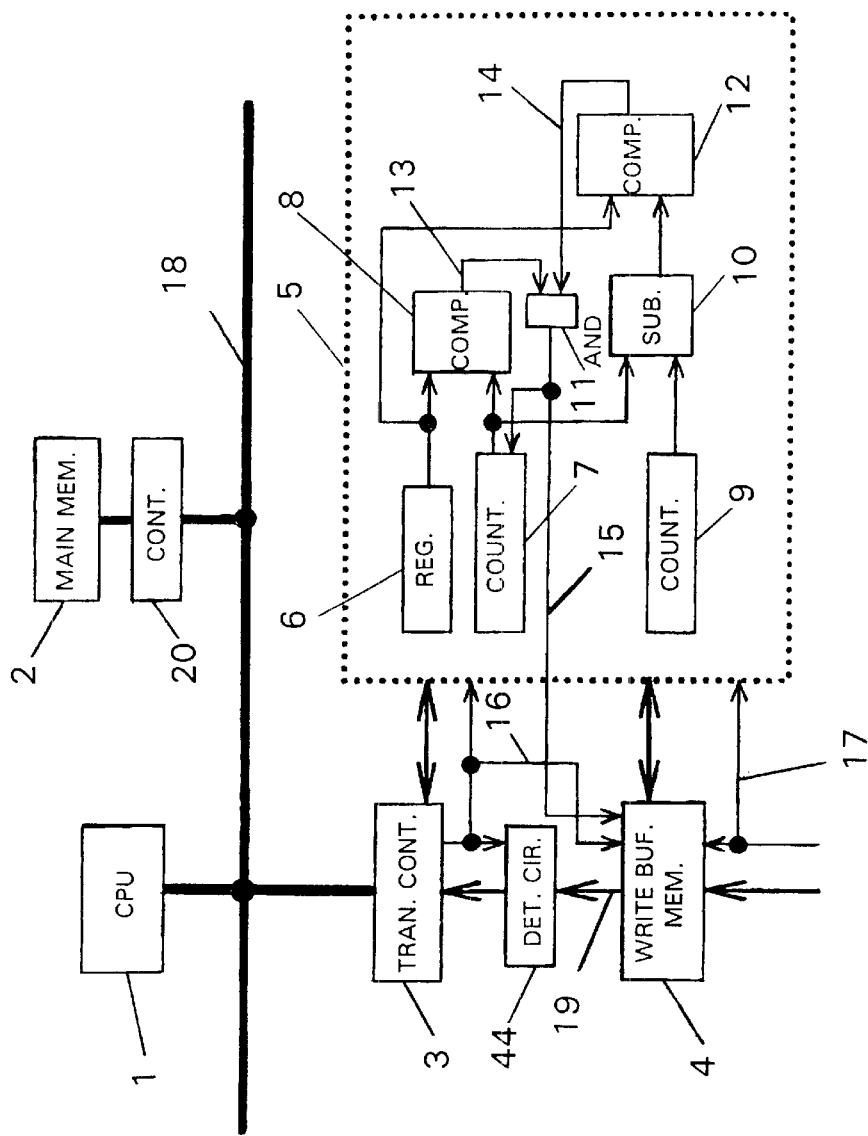
FIG. 5 is a block diagram showing an outlined configuration of a data transfer apparatus and data transfer system in Embodiment 5 of the present invention.

FIG. 5 is a block diagram showing an outlined configuration of a data transfer apparatus and data transfer system according to Embodiment 5 of the present invention. The data transfer apparatus in the present embodiment is the same as the data transfer apparatus in Embodiment 1 except that the data transfer apparatus is provided with a protection signal detection circuit 44 corresponding to the transfer control means on the apparatus side of the present invention. Therefore, the parts not especially specified in the present embodiment are assumed to be the same as those in Embodiment 1 and the components assigned the same numeral as those in Embodiment 1 are assumed to have the same functions as those in Embodiment 1 unless specified otherwise. Furthermore, the modification examples described in Embodiment 1 are also assumed to be applicable to the present embodiment with similar modifications unless otherwise specified.

In FIG. 5, reference numeral 44 is a protection signal detection circuit and connected to the write buffer memory 4 and the transfer controller 3 via the input data bus 19.

The operation of the data transfer apparatus and data transfer system of the present embodiment configured as shown above will be explained below.

The operations until a data read from the write buffer memory 4 is started are the same as those explained in Embodiment 1. The data read from the write buffer memory 4 is input to the protection signal detection circuit 44 via the input data bus 19 in synchronization with the read clock 16. The protection signal detection circuit 44 detects a protection signal from continuously input data and if the protection signal described above matches a predetermined protection signal, the protection signal detection circuit 44 enables a transfer to the transfer controller 3 and the data can be transferred via the multi-bus 18. The predetermined protection signal to be compared with the protection signal described above is set by the CPU 1 via the transfer controller 3 in the protection signal detection circuit 44. If a protection signal detected by the protection signal detection circuit 44 is different from the predetermined protection signal, a transfer to the main memory 2 is not carried out. Once the transfer is enabled, the data read from the write buffer memory 4 is stored temporarily in a buffer in the transfer controller 3 and after the storage, the transfer controller 3 issues an access request to the multi-bus 18. Upon acquiring the access right, the transfer controller 3 sends the address of the main memory 2, write command and data to the main memory controller 20 via the multi-bus 18 and the data is written to the main memory 2.

Thus, in addition to the effects obtained in Embodiment 1, the present embodiment does not allow the continuously input data whose transfer is not enabled by the protection signal detection circuit 44 to be transferred to the main memory 2, thus preventing video data or voice data, etc. to be protected under copyrights from being copied.

Meanwhile, the present embodiment is provided with the protection signal detection circuit 44 between the transfer controller 3 and the write buffer memory 4, but the present embodiment is not limited to this; the protection signal detection circuit 44 can be provided between the transfer controller 3 and the multi-bus 18 or in the input stage of the write buffer memory 4, for example.

The data transfer apparatus in the present embodiment has been explained as being the same as the data transfer apparatus in Embodiment 1 except that the data transfer apparatus is provided with the protection signal detection circuit 44 corresponding to the transfer control means on the apparatus side of the present invention. However, the present embodiment is not limited to this; for example, even if the present embodiment is the same as the data transfer system in Embodiment 3 or 4 except that the present embodiment is provided with the protection signal detection circuit 44 corresponding to the transfer control means on the apparatus side of the present invention, the present embodiment can prevent video data or voice data, etc. to be protected under copyrights from being copied.

Furthermore, the transfer control means on the apparatus side of the present invention in the present embodiment has been explained which enables a transfer to the transfer controller 3 if the protection signal in the continuously input data matches a predetermined protection signal. However, the present embodiment is not limited to this; for example the present embodiment can also be implemented so as to enable a transfer to the transfer controller 3 if the protection signal in the continuously input data mismatches a predetermined protection signal. In short, the present embodiment can enable transmission to the transfer destination according to the presence/absence of a protection signal in continuously input data or the protection signal.

Embodiment 6

Figure 6:
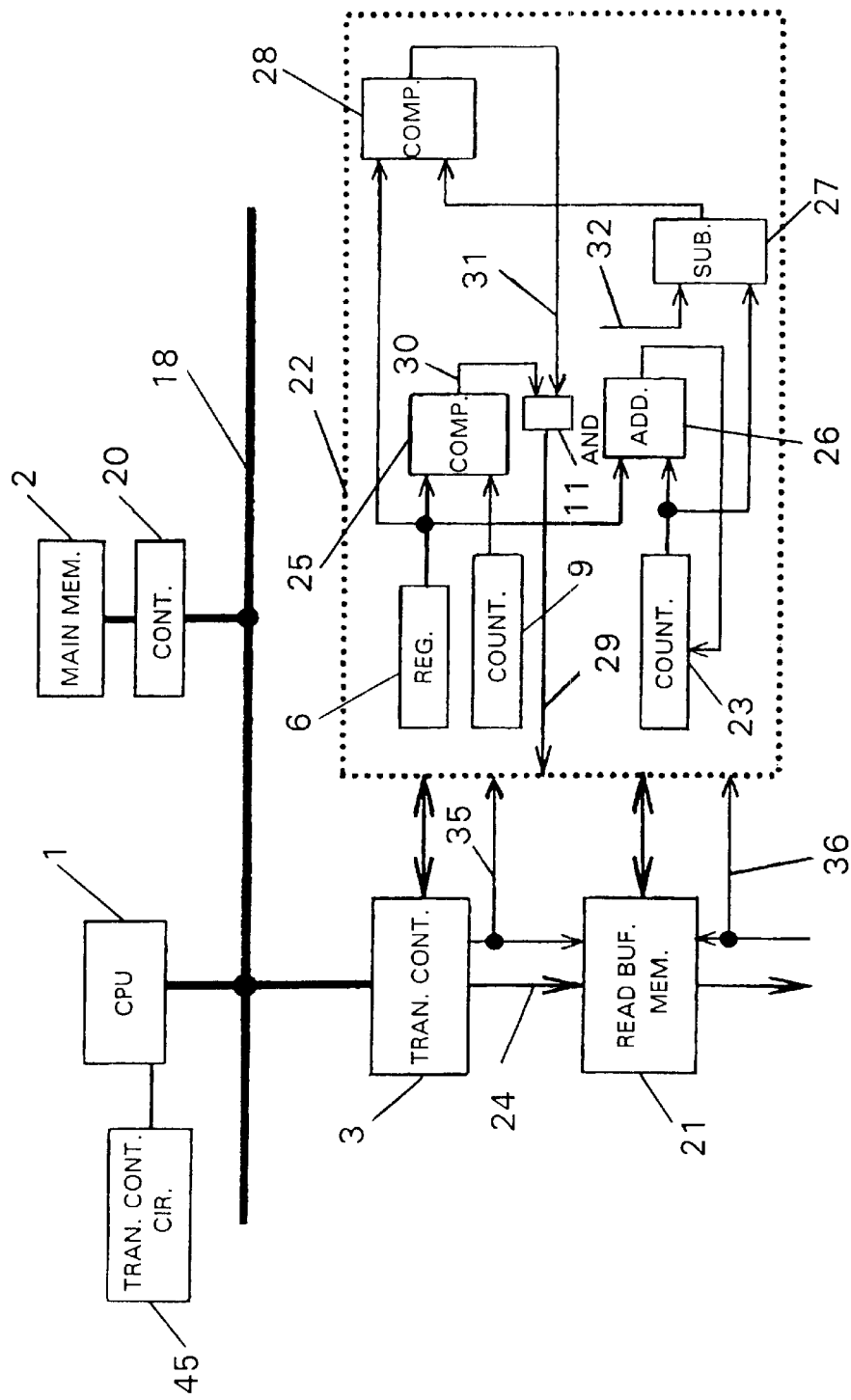
FIG. 6 is a block diagram showing an outlined configuration of a data transfer apparatus and data transfer system in Embodiment 6 of the present invention.

FIG. 6 is a block diagram showing an outlined configuration of a data transfer apparatus and data transfer system according to Embodiment 6 of the present invention. The data transfer system in the present embodiment is the same as the data transfer system in Embodiment 2 except that the data transfer system is provided with a transfer control circuit 45 corresponding to the transfer control means on the transfer destination side of the present invention. Therefore, the parts not especially specified in the present embodiment are assumed to be the same as those in Embodiment 2 and the components assigned the same numeral as those in Embodiment 2 are assumed to have the same functions as those in Embodiment 2 unless specified otherwise. Furthermore, the modification examples described in Embodiment 2 are also assumed to be applicable to the present embodiment with similar modifications unless otherwise specified.

In FIG. 6, 45 is a transfer control circuit and controls transfers from the main memory 2.

The operation of the data transfer apparatus and data transfer system of the present embodiment configured as shown above will be explained below.

The CPU 1 extracts a protection signal from transfer data written in the main memory 2. If the protection signal extracted by the CPU 1 matches a predetermined protection signal, the transfer control circuit 45 can enable and transfer an external output to the transfer controller 3. The predetermined protection signal to be compared with the extracted protection signal is set by the CPU 1. If the extracted protection signal set by the CPU 1 is different from the predetermined protection signal, the transfer control circuit 45 does not enable transfers to external devices or the multi-bus 18.

When the transfer control circuit 45 enables a data transfer, after the data in the main memory 2 is ready to be transferred to the read buffer memory 21, the CPU 1 sends a transfer enable, transfer size and the address of the main memory 2, which is a transfer source, to the transfer controller 3. The operations hereafter are the same as that explained in Embodiment 2.

Thus, in addition to the effects obtained by Embodiment 2, the present embodiment does not allow continuously output data whose transfer is not allowed by the transfer control circuit 45 to be transferred from the main memory 2, thus preventing video data or voice data, etc. protected under copyrights from being copied.

Meanwhile, in the present embodiment, the transfer control circuit is implemented by hardware, but the present embodiment is not limited to this; the transfer control circuit can also be implemented by software that operates the CPU 1, for example.

The data transfer system in the present embodiment has been explained as being the same as the data transfer system in Embodiment 2 except that the data transfer system is provided with the transfer control circuit 45 corresponding to the transfer control means on the transfer destination side of the present invention. However, the present embodiment is not limited to this; for example, even if the present embodiment is the same as the data transfer apparatus in Embodiment 3 or 4 except that the data transfer apparatus is provided with the transfer control circuit 45 corresponding to the transfer control means on the transfer destination side of the present invention, the present embodiment can prevent video data or voice data, etc. protected under copyrights from being copied.

Furthermore, the transfer control means on the transfer destination side of the present invention in the present embodiment has been explained as enabling a transfer to the multi-bus 18, etc. if the protection signal in the output data matches a predetermined protection signal. However, the present embodiment is not limited to this; for example the present embodiment can also be implemented so as to enable a transfer to the multi-bus 18, etc. if the protection signal in the output data mismatches a predetermined protection signal. In short, the present embodiment can enable transmission to the data transfer apparatus according to the presence/absence of a protection signal in output data or the protection signal.

Embodiment 7

Figure 7:
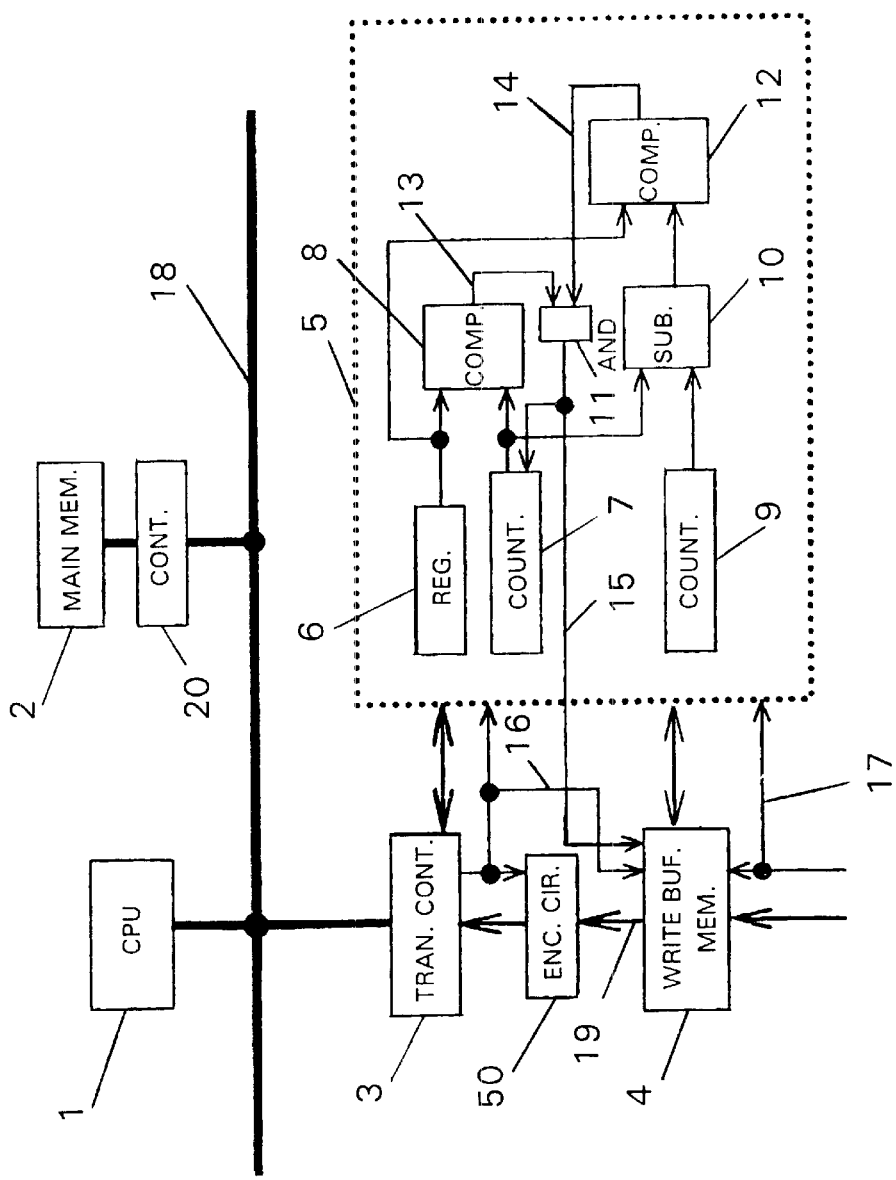
FIG. 7 is a block diagram showing an outlined configuration of a data transfer apparatus and data transfer system in Embodiment 7 of the present invention.

FIG. 7 is a block diagram showing an outlined configuration of a data transfer apparatus and data transfer system according to Embodiment 7 of the present invention. The data transfer apparatus in the present embodiment is the same as the data transfer apparatus in Embodiment 1 except that the data transfer apparatus is provided with a first encryption circuit 50. Therefore, the parts not especially specified in the present embodiment are assumed to be the same as those in Embodiment 1 and the components assigned the same numeral as those in Embodiment 1 are assumed to have the same functions as those in Embodiment 1 unless specified otherwise. Furthermore, the modification examples described in Embodiment 1 are also assumed to be applicable to the present embodiment with similar modifications unless otherwise specified.

In FIG. 7, reference numeral 50 is a first encryption circuit and connected with the write buffer memory 4 and the transfer controller 3 via the input data bus 19.

The operation of the data transfer apparatus and data transfer system of the present embodiment configured as shown above will be explained below.

The operation until a data read from the write buffer memory 4 is started is the same as that in Embodiment 1. The data read from the write buffer memory is input to the first encryption circuit 50 in synchronization with the read clock 16 via the input data bus 19. The first encryption circuit 50 detects a protection signal from continuously input data.

Table 1 shows a protection signal example.

TABLE 1

| |
|---|
| Mode A Copy free |
| Mode B Copy one generation |
| Mode C No more copy |
| Mode D Copy never |

The Table 1 shows that in mode A, free copying is allowed; in mode B, copying with predetermined authentication is allowed; in mode C, data whose first-generation copy is allowed has already been copied; in mode D, an exchange of data with predetermined authentication is allowed but copying is prohibited. By the way, there can also be two types of protection signal, instead of four modes as shown in Table 1; copying enabled corresponding to the mode A and copying disabled corresponding to the mode D.

As the encryption control method by means of the protection signal described above, for example, if the protection signal described above matches a predetermined protection signal, continuously input data can be encrypted and transferred to the transfer controller 3. The predetermined protection signal to be compared with the protection signal described above is set in the first encryption circuit 50 by the CPU 1 via the transfer controller 3. If the protection signal detected by the first encryption circuit 50 is different from the predetermined protection signal, no transfer to the main memory 2 is performed. Once the transfer is enabled, the continuously input data is encrypted and the data read from the write buffer memory 4 is stored in a buffer in the transfer controller 3 temporarily and after the storage, the transfer controller 3 issues an access request to the multi-bus 18. Upon acquiring the access right, the transfer controller 3 sends the address of the main memory 2, write command and data to the main memory controller 20 via the multi-bus 18 and data is written to the main memory 2.

As another encryption control method using the protection signal described above, according to the detected protection signal, for example, in the mode B, C or D, the continuously input data is encrypted and the data read from the write buffer memory 4 is stored in the buffer in the transfer controller 3 temporarily and after the storage, the transfer controller 3 issues an access request to the multi-bus 18. Upon acquiring the access right, the transfer controller 3 sends the address of the main memory 2, write command and data to the main memory controller 20 via the multi-bus 18 and the data is written to the main memory 2. According to the extracted protection signal, for example, in the mode A, the continuously input data is not encrypted and the data read from the write buffer memory 4 is stored in the buffer in the transfer controller 3 temporarily, and after the storage, the transfer controller 3 issues an access request to the multi-bus 18. Upon acquiring the access right, the transfer controller 3 sends the address of the main memory 2, write command and data to the main memory controller 20 via the multi-bus 18 and the data is written to the main memory 2.

Thus, in addition to the effects obtained by Embodiment 1, in the present embodiment, if the encrypted continuously input data whose transfer was enabled by the first encryption circuit 50 is video data or voice data, etc. requiring protection under copyrights, even if the data is transferred to the main memory 2, the data cannot be decoded to the original video data or voice data unless the data is decrypted, thus preventing the data from being copied.

Meanwhile, in the present embodiment, the first encryption circuit 50 is provided between the transfer controller 3 and the write buffer memory 4, but the present embodiment is not limited to this, the first encryption circuit 50 can also be provided between the transfer controller 3 and the multi-bus 18 or in the input stage of the write buffer memory 4, for example.

The data transfer apparatus in the present embodiment has been explained as being the same as the data transfer system in Embodiment 1 except that the data transfer apparatus is provided with the first encryption circuit 50 corresponding to the encryption means of the present invention. However, the present embodiment is not limited to this; for example, even if the present embodiment is the same as the data transfer apparatus in Embodiment 3 or 4 except that the data transfer apparatus is provided with the first encryption circuit 50 corresponding to encryption means of the present invention, the present embodiment can prevent video data or voice data, etc. protected under copyrights from being copied.

Furthermore, the first encryption means of the present invention in the present embodiment can be implemented if the first encryption means detects whether the continuously input data includes a predetermined protection signal or not, and if the predetermined protection signal is included, the first encryption means encrypts the data and transmits the data to the transfer destination.

Embodiment 8

Figure 8:
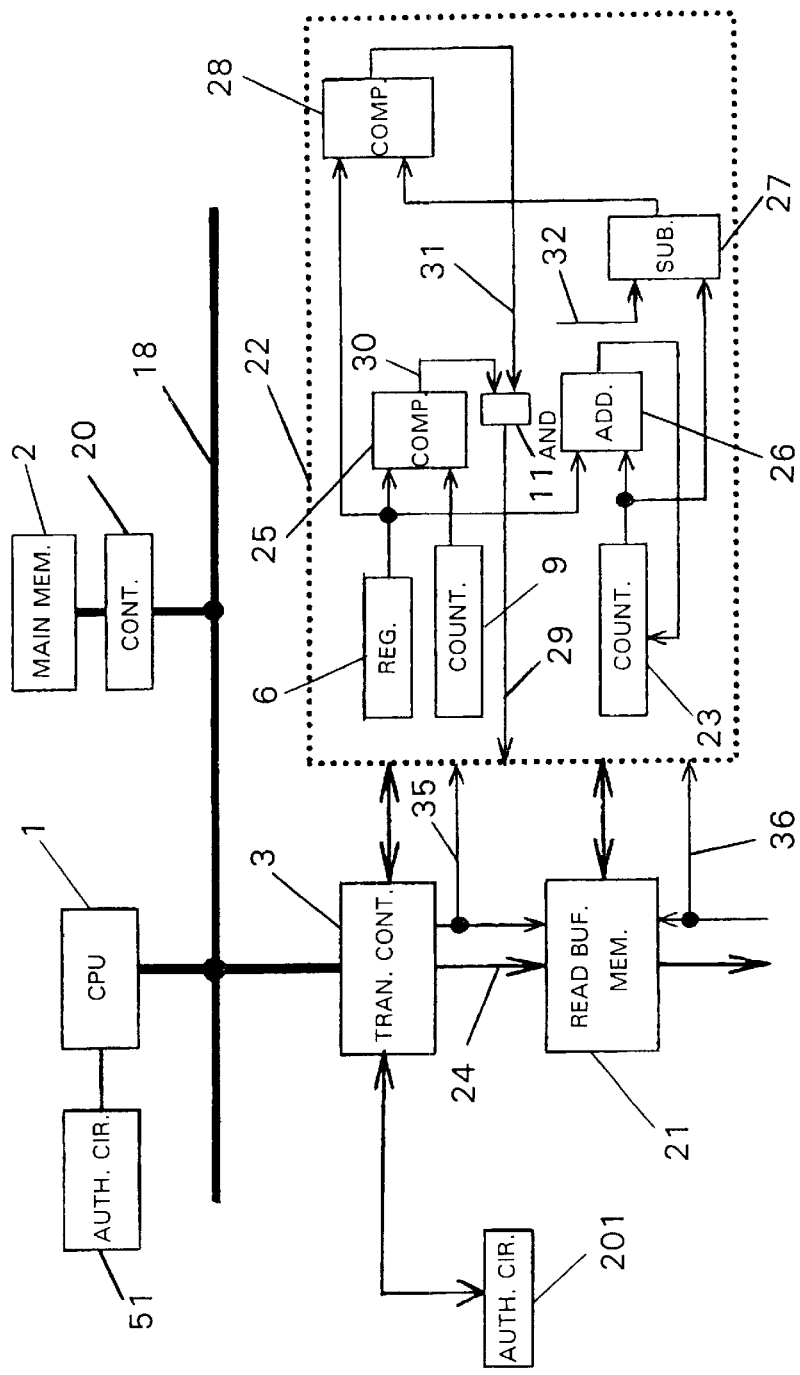
FIG. 8 is a block diagram showing an outlined configuration of a data transfer apparatus and data transfer system in Embodiment 8 of the present invention.

FIG. 8 is a block diagram showing an outlined configuration of a data transfer apparatus and data transfer system according to Embodiment 8 of the present invention. The data transfer system in the present embodiment is the same as the data transfer system in Embodiment 2 except that the data transfer system is provided with a first authentication means 51 to perform authentication for encryption on the transfer destination side and second authentication means 201 to perform authentication on the transfer apparatus side. Therefore, the parts not especially specified in the present embodiment are assumed to be the same as those in Embodiment 2 and the components assigned the same numeral as those in Embodiment 2 are assumed to have the same functions as those in Embodiment 2 unless specified otherwise. Furthermore, the modification examples described in Embodiment 2 are also assumed to be applicable to the present embodiment with similar modifications unless otherwise specified.

In FIG. 8, reference numeral 51 is a first authentication circuit that authenticates encrypted data in the main memory 2.

The operation of the data transfer apparatus and data transfer system of the present embodiment configured as shown above will be explained below.

The CPU 1 extracts a protection signal from the encrypted transfer data written in the main memory 2. If the protection signal extracted by the CPU 1 matches a predetermined protection signal, the first encryption authentication circuit 51 performs authentication on the transfer controller 3, the destination of the encrypted transfer data in the main memory 2. Once the transfer controller 3 is authenticated by the first encryption authentication circuit 51, the encrypted transfer data can be transferred to the transfer controller 3. The predetermined protection signal to be compared with the extracted protection signal is set by the CPU 1. If authentication using the extracted protection signal is not possible or if the protection signal extracted by the CPU 1 is different from the predetermined protection signal, the first authentication circuit 51 does not allow the CPU 1 to transfer the data from the main memory 2 to external devices or the multi-bus 18.

Once the first authentication circuit 51 and second authentication means 201 have authenticated the encrypted transfer data, if the data in the main memory 2 is ready to be transferred to the read buffer memory 21, the CPU 1 sends a transfer enable, transfer size and the address of the main memory 2, which is the transfer source, to the transfer controller 3. The operations hereafter are the same as those explained in Embodiment 2. The encrypted data is decrypted at the final output destination.

In addition to the effects obtained in Embodiment 2, the present embodiment does not allow the continuously output data that cannot be authenticated by the first authentication circuit 51 to be transferred from the main memory 2, thus preventing video data or voice data, etc. protected under copyrights from being copied.

The data transfer system in the present embodiment has been explained as being the same as the data transfer system in Embodiment 2 except that the data transfer system is provided with the first authentication means 51 and the second authentication means 201. However, the present embodiment is not limited to this; for example, even if the present go embodiment is the same as the data transfer apparatus in Embodiment 3 or 4 except that the data transfer system is provided with the first authentication means 51 and the second authentication means 201, the present embodiment can prevent video data or voice data, etc. protected under copyrights from being copied.

Moreover, the present embodiment has been explained as enabling a transfer to the multi-bus 18, etc. if the protection signal in the output data matches a predetermined protection signal and at the same time the transfer controller 3 is authenticated. However, the present embodiment is not limited to this; the present embodiment can also enable a transfer to the multi-bus 18, etc. without performing authentication. In short, the present embodiment can perform authentication on the data transfer apparatus according to the presence/absence of a protection signal in the output data or the protection signal and allow transmission to the data transfer apparatus only when the data transfer apparatus is authenticated.

Embodiment 9

Figure 9:
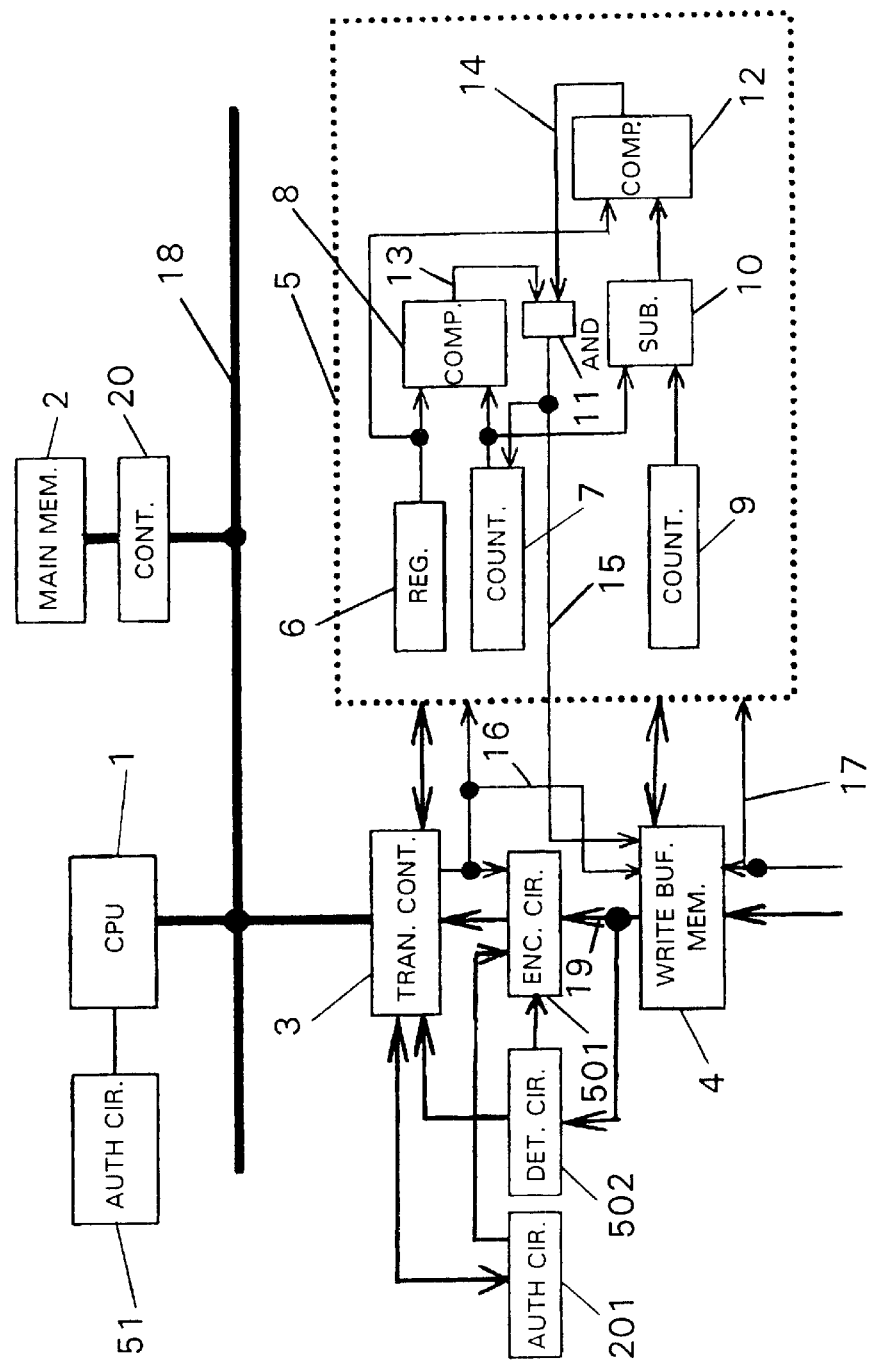
FIG. 9 is a block diagram showing an outlined figuration of a data transfer apparatus and data transfer system in Embodiment 9 of the present invention.
Figure 10:
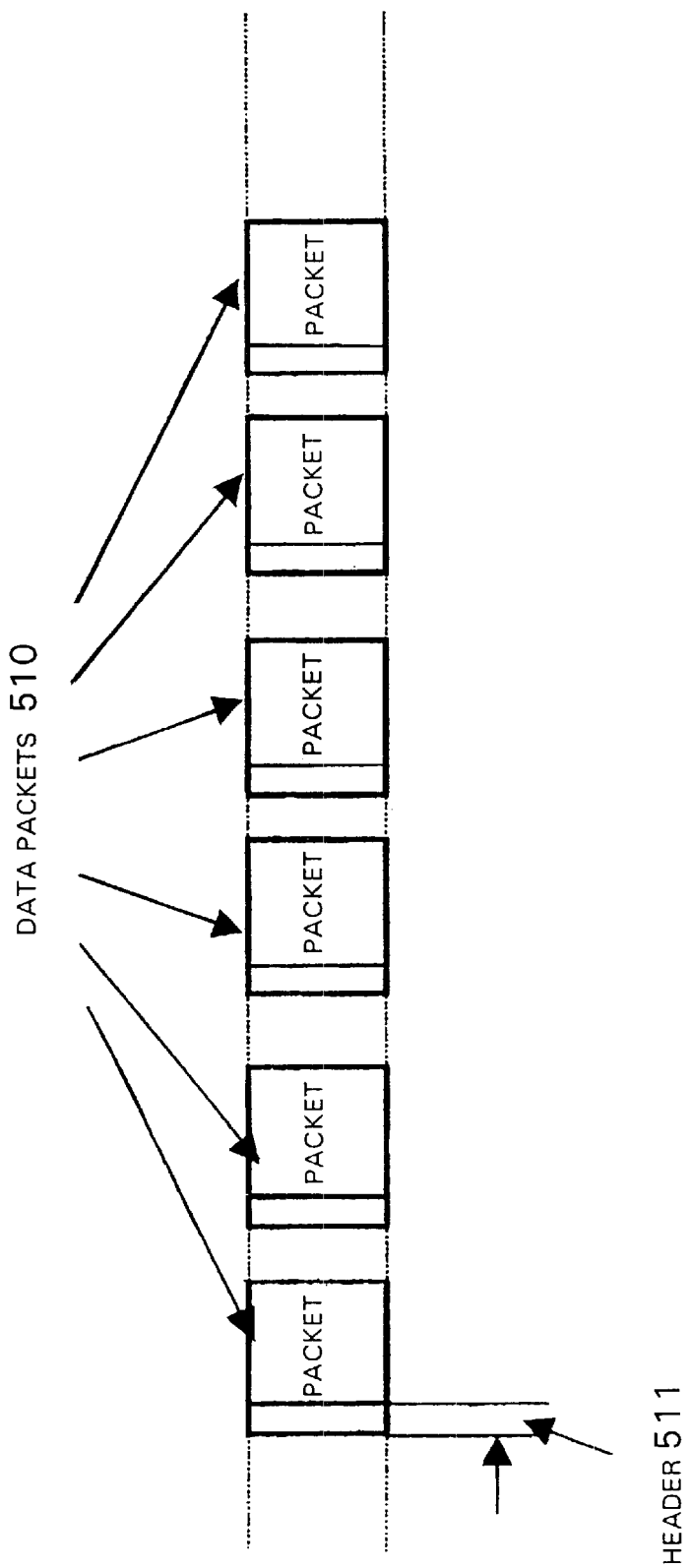
FIG. 10 is a drawing showing a configuration of data sent a multi-bus in Embodiment 9 of the present invention.
Figure 11:
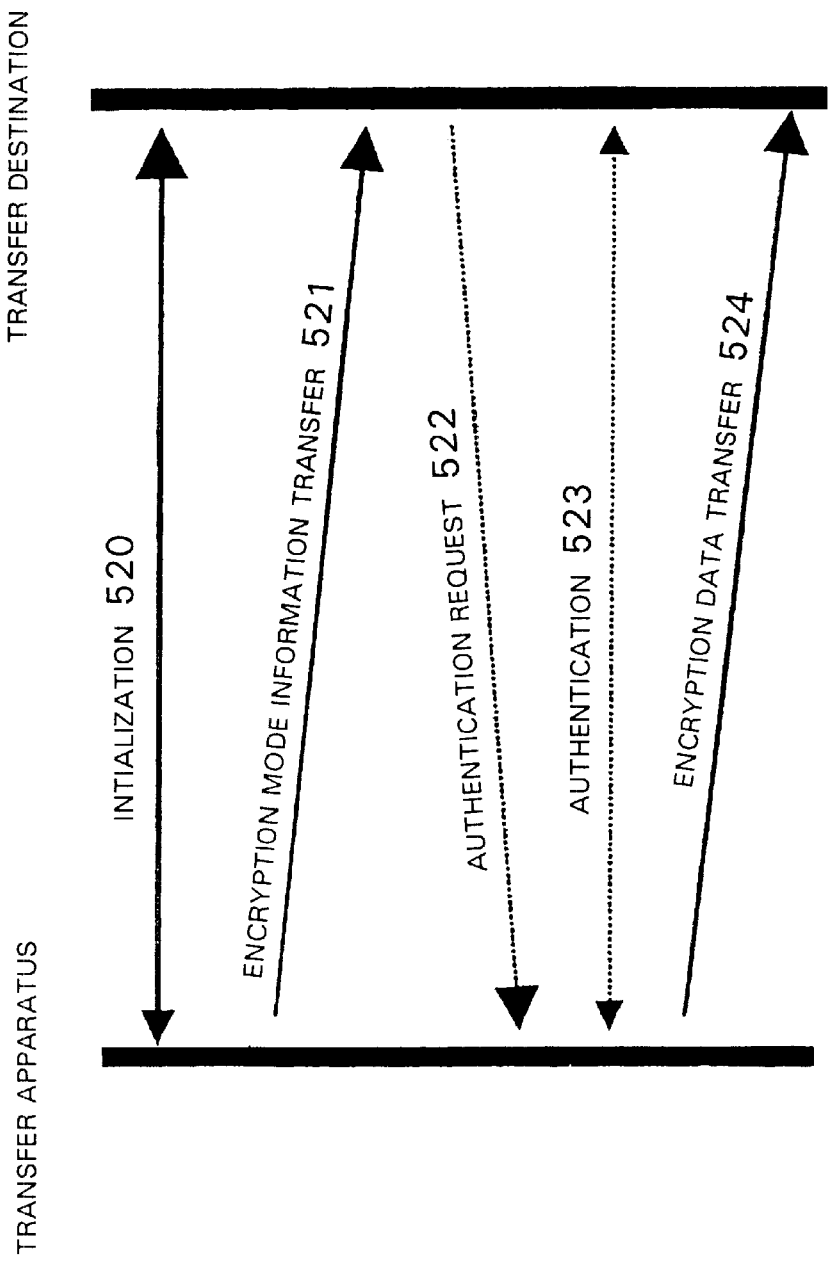
FIG. 11 is a drawing showing a data transfer procedure in Embodiment 9 of the present invention.

FIG. 9 is a block diagram showing an outlined configuration of a data transfer apparatus and data transfer system according to Embodiment 9 of the present invention. FIG. 10 shows a configuration of data sent to the multi-bus 18 and FIG. 11 shows the transfer procedure.

In FIG. 9, the data transfer apparatus in the present embodiment is the same as the data transfer apparatus in Embodiment 1 except that the data transfer apparatus is provided with a second encryption circuit 501, a protection signal detection circuit 502, the second authentication means 201 and the first authentication means 51. Therefore, the parts not especially specified in the present embodiment are assumed to be the same as those in Embodiment 1 and the components assigned the same numeral as those in Embodiment 1 are assumed to have the same functions as those in Embodiment 1 unless specified otherwise. Furthermore, the modification examples described in Embodiment 1 are also assumed to be applicable to the present embodiment with similar modifications unless otherwise specified. In FIG. 10, reference numeral 510 is a data packet and 511 is a header including encryption mode information.

In FIG. 9, reference numeral 501 is a second encryption circuit. Reference numeral 502 is a protection signal detection means, connected with the transfer controller 3 and the write buffer memory 4 and detects a protection signal from continuously input data and outputs encryption mode information. Reference numeral 201 is a second authentication means and is connected with the transfer controller 3.

The operation of the data transfer apparatus and data transfer system of the present embodiment configured as shown above will be explained below.

The operation until a data read from the write buffer memory 4 is started is the same as that explained in Embodiment 1. The data read from the write buffer memory is input to the second encryption circuit 501 and the protection signal detection circuit 502 in synchronization with the read clock 16 via the input data bus 19. The protection signal detection circuit 502 detects a protection signal from the continuously input data and sets the protection signal in the second encryption circuit 501. Suppose the protection signal is the same as that in Table 1 in Embodiment 7.

FIG. 11 shows the transfer procedure. The transfer apparatus and transfer destination perform multi-bus initialization 520. Then the transfer apparatus sends a protection signal to the transfer destination. The transfer destination sends authentication request 522 to the transfer apparatus according to the protection information if necessary, and the transfer apparatus and transfer destination perform authentication 523. After the authentication 523 is established between the first authentication means 51 and the second authentication means 201, the transfer apparatus performs encrypted data transfer 524 to the transfer destination.

In FIG. 9, according to the detected protection signal, for example in the case of the mode B, C or D shown in Table 1, the continuously input data is encrypted and the data read from the write buffer memory 4 is stored in a buffer in the transfer controller 3 temporarily and after the storage, the transfer controller 3 issues an access request to the multi-bus 18. Upon acquiring the access right, the transfer controller 3 sends the address of the main memory 2, a write command and data to the main memory controller 20 via the multi-bus 18 and the data is written to the main memory 2.

According to the detected protection signal, for example in the case of the mode A shown in Table 1, the continuously input data is not encrypted and the data read from the write buffer memory 4 is stored in a buffer in the transfer controller 3 temporarily and after the storage, the transfer controller 3 issues an access request to the multi-bus 18. Upon acquiring the access right, the transfer controller 3 sends the address of the main memory 2, a write command and data to the main memory controller 20 via the multi-bus 18 and the data is written to the main memory 2.

Furthermore, encryption mode information set according to the protection signal detected by the protection signal detection circuit 502 is set. Table 2 below shows an example of the encryption mode information.

The encryption mode information is sent while being attached to encrypted data. The method of generating encryption mode information from a protection signal is supposed to be the same protection signal here, but the present embodiment is not limited to this.

TABLE 2

| Mode A Copy free |
| Mode B Copy one generation |
| Mode C No more copy |
| Mode D Copy never |

Table 2 described above shows that in mode A, free copying is allowed; in mode B, copying with predetermined authentication is allowed; in mode C, data whose first-generation copy is allowed has already been copied; in mode D, an exchange of data with predetermined authentication can be allowed but copying is prohibited.

The encryption mode information is sent without being encrypted from the protection signal detection means 502 to the transfer controller 3. Since the encryption mode information is not encrypted, the transfer destination can read the encryption mode information even if the transfer data is encrypted. In FIG. 11, upon acquiring the access right, the transfer controller 3 sends the address of the main memory 2, a write command and data to the main memory controller 20 via the multi-bus 18 and the data is written to the main memory 2.

FIG. 10 shows an example of data sent to the multi-bus 18. The encryption mode information is included in the header 511 and then sent, but since the encryption mode information is not encrypted, the transfer destination can use it no matter whether a data packet is encrypted or not. The data packets 510 may or may not be encrypted with encryption mode information.

Thus, in the present embodiment, in addition to the effects obtained in Embodiment 1, if the continuously input data encrypted by the second encryption circuit 501 is video data or voice data, etc. requiring copyright protection, the continuously input data cannot be decoded to the original video data or voice data unless they are decrypted even if transferred to the main memory 2, which prevents such data from being copied.

The data transfer apparatus in the present embodiment has been explained as being the same as the data transfer apparatus in Embodiment 1 except that the data transfer apparatus is provided with the second encryption circuit 501, the protection signal detection circuit 502, the second authentication means 201 and the first authentication means 51. However, the present embodiment is not limited to this; for example, even if the present embodiment is the same as the data transfer apparatus in Embodiments 3 to 7 except that the data transfer apparatus is provided with the second encryption circuit 501, the protection signal detection circuit 502, the second authentication means 201 and the first authentication means 51, the present embodiment can prevent video data or voice data, etc. protected under copyrights from being copied.

Embodiment 10

Figure 12:
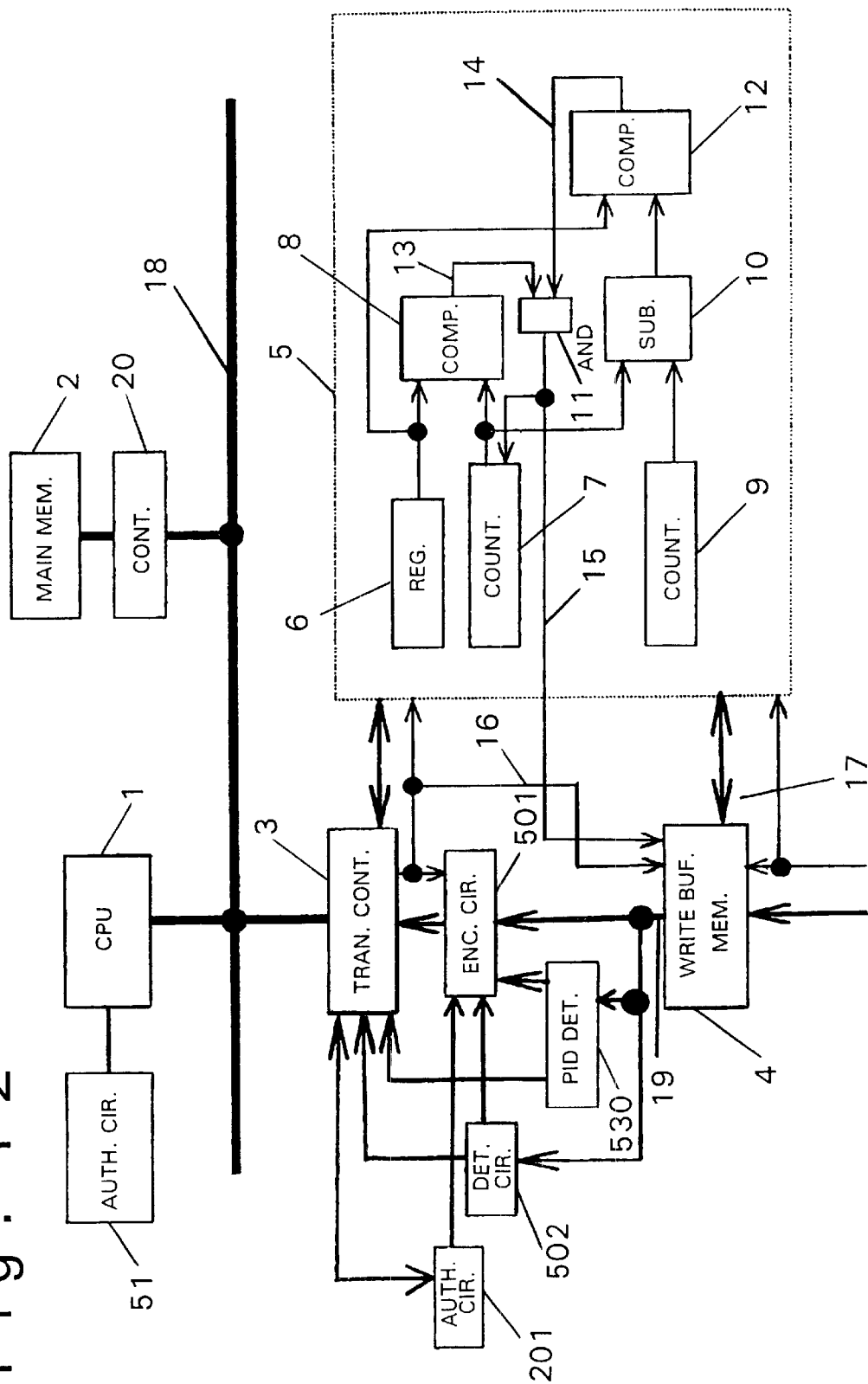
FIG. 12 is a block diagram showing an outlined figuration of a data transfer apparatus and data transfer system in Embodiment 10 of the present invention.
Figure 13:
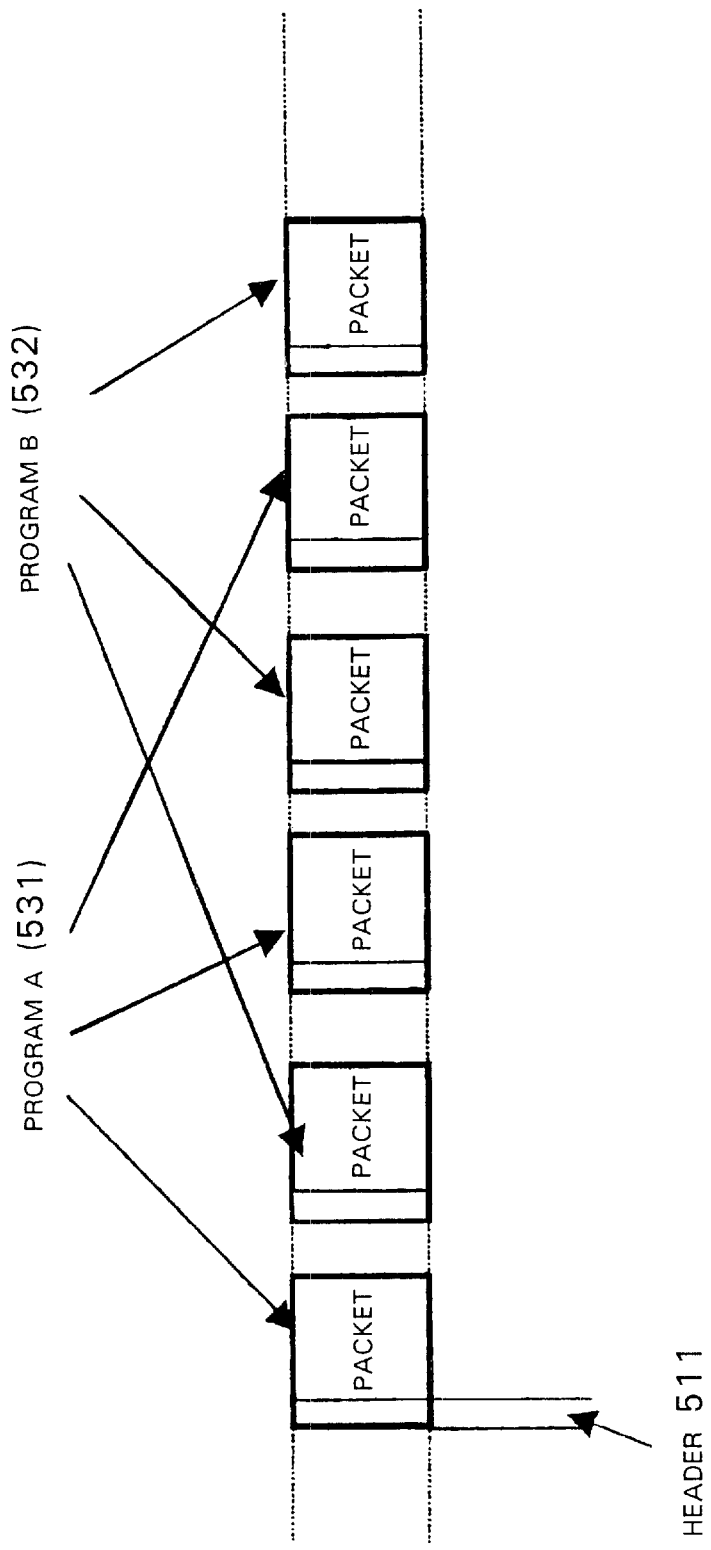
FIG. 13 is a drawing showing a configuration of data sent a multi-bus in Embodiment 10 of the present invention.

FIG. 12 is a block diagram showing an outlined configuration of a data transfer apparatus and data transfer system according to Embodiment 10 of the present invention and FIG. 13 shows a configuration of data sent to the multi-bus 18.

In FIG. 12, the data transfer apparatus in the present embodiment is the same as the data transfer apparatus in Embodiment 9 except that the data transfer apparatus is provided with a PID detection means 530 that detects a packet identification signal (PID). Therefore, the parts not especially specified in the present embodiment are assumed to be the same as those in Embodiment 9 and the components assigned the same numeral as those in Embodiment 9 are assumed to have the same functions as those in Embodiment 9 unless specified otherwise. Furthermore, the modification examples described in Embodiment 9 are also assumed to be applicable to the present embodiment with similar modifications unless otherwise specified. In FIG. 13, reference numeral 531 is program A packets and 532 is program B packets.

The operation of the data transfer apparatus and data transfer system of the present embodiment configured as shown above will be explained below.

The operation until a data read from the write buffer memory 4 is started is the same as that explained in Embodiment 1. The data read from the write buffer memory is input to the second encryption circuit 501 and the protection signal detection circuit 502 in synchronization with the read clock 16 via the input data bus 19. The protection signal detection circuit 502 detects a protection signal from the continuously input data and sets the protection signal in the second encryption circuit and encryption mode information is generated. Furthermore, the PID detection means 530 detects a packet identification signal (PID) attached to the packet of input data and sends the PID to the second encryption circuit 501. The second encryption circuit controls whether or not to perform encryption. That is, in FIG. 13, if the program A can be freely copied, the second encryption circuit 501 does not perform encryption and sets the mode A, for example, as encryption mode information and attaches this as the header information at the start of the program A packet, and if a first-generation copy is allowed for the program B, the second encryption circuit 501 performs encryption and sets the mode B, for example, as encryption mode information and attaches this as the header information at the start of the program B packet. Since encryption mode information 511 is not encrypted, the transfer destination can use the encryption mode information no matter whether the data packet is encrypted or not. The data packet 510 may or may not be encrypted by encryption mode information.

Thus, in addition to the effects obtained in Embodiment 9, the present embodiment can send data by changing encryption for every program and changing encryption mode information, and therefore can send encrypted data multiplexed with non-encrypted data.

Here, it is obvious that if no authentication is required, neither the first authentication means 201 nor the second authentication means 51 is used.

Embodiment 11

Figure 14:
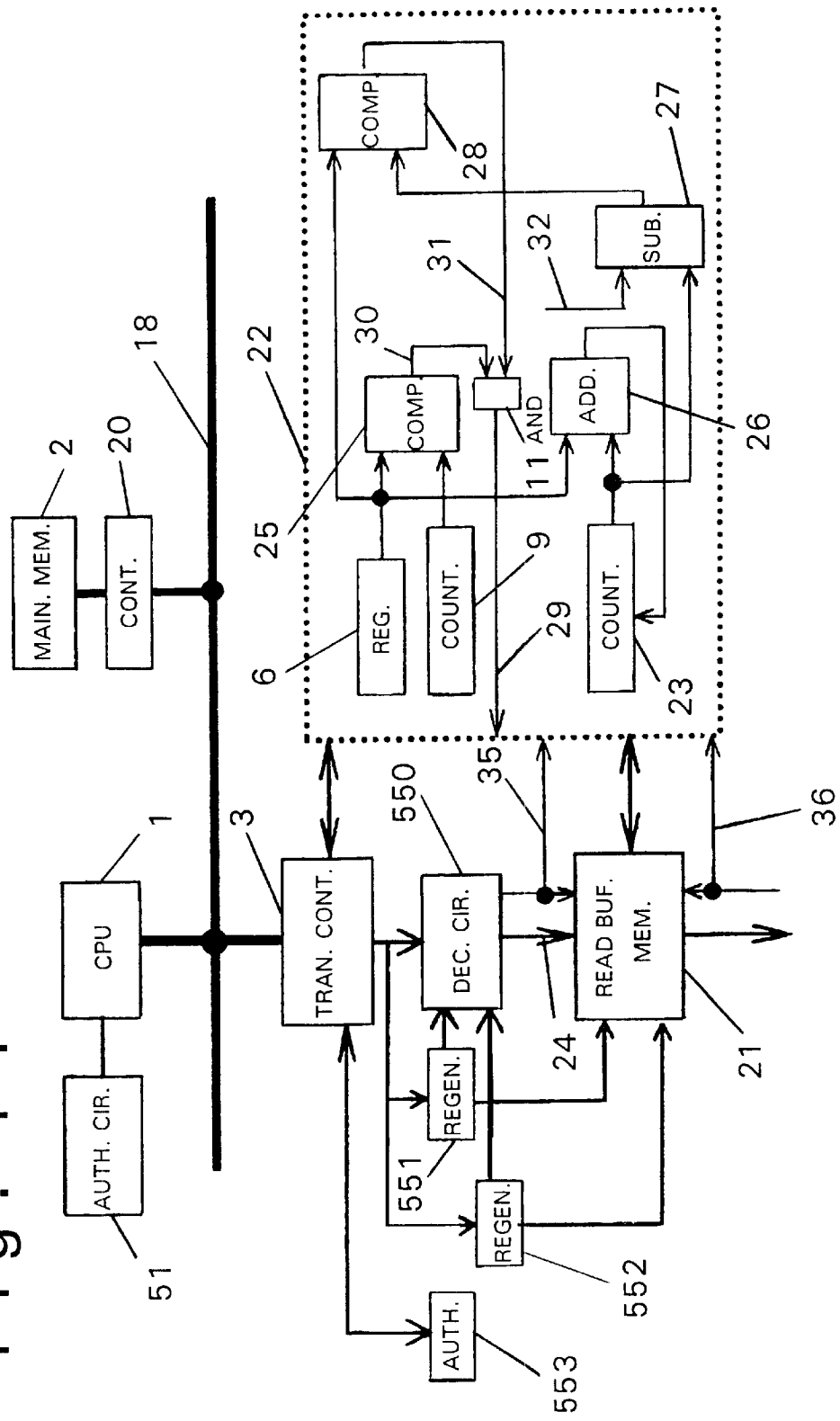
FIG. 14 is a block diagram showing an outlined figuration of a data transfer apparatus and data transfer system in Embodiment 11 of the present invention.
Figure 15:
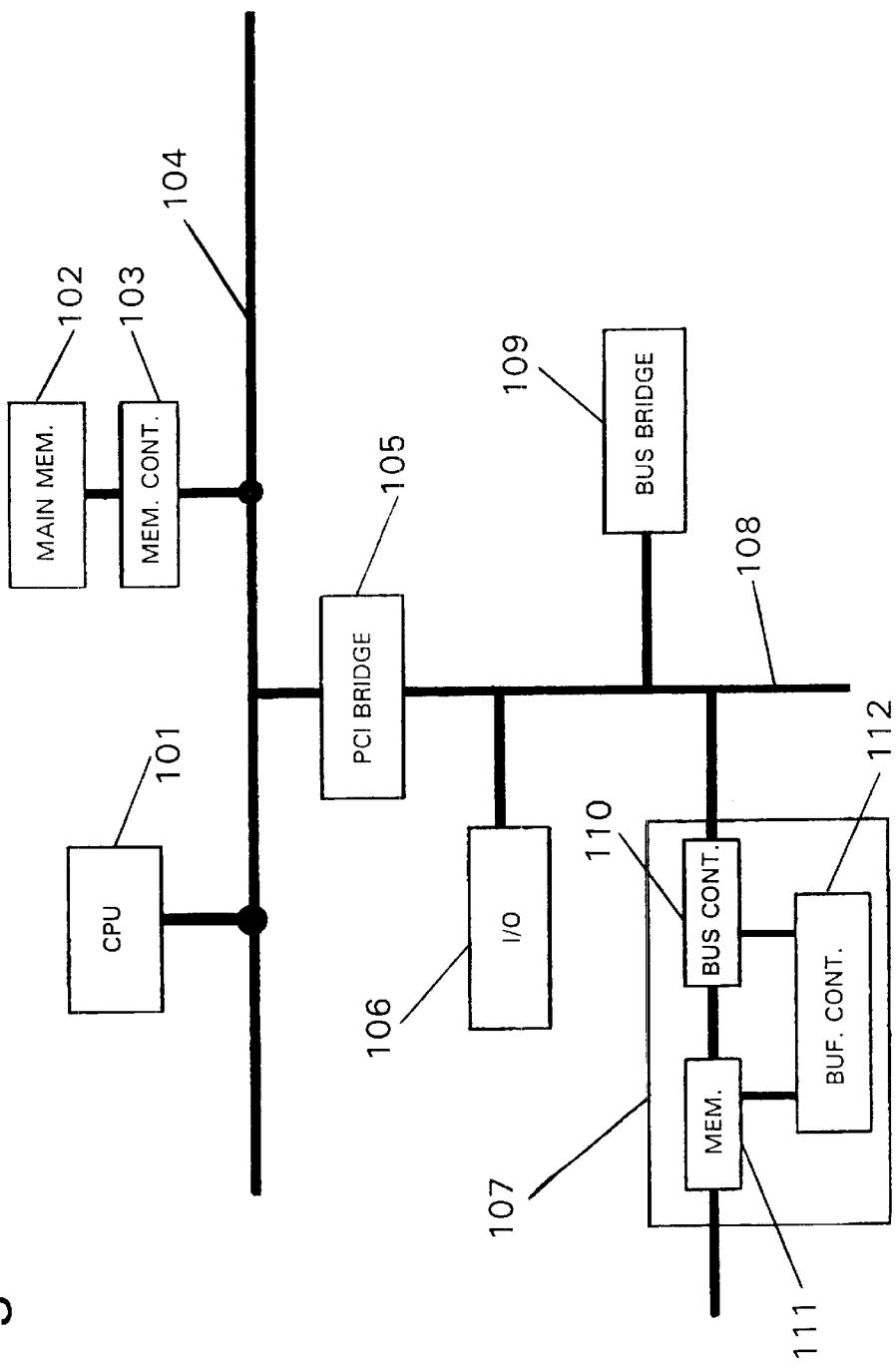
FIG. 15 is a system block diagram of a conventional PCI bus.

FIG. 14 is a block diagram showing an outlined configuration of a data transfer apparatus and data transfer system according to Embodiment 11 of the present invention. In FIG. 14, the data transfer apparatus in the present embodiment is the same as the data transfer apparatus in Embodiment 2 except that the data transfer apparatus is provided with a decryption circuit 550, PID regeneration means 551, a protection signal regeneration circuit 552, a second authentication means 553 and first authentication means 51. Therefore, the parts not especially specified in the present embodiment are assumed to be the same as those in Embodiment 2 and the components assigned the same numeral as those in Embodiment 2 are assumed to have the same functions as those in Embodiment 2 unless specified otherwise. Furthermore, the modification examples described in Embodiment 2 are also assumed to be applicable to the present embodiment with similar modifications unless otherwise specified.

In FIG. 14, reference numeral 550 is decryption means that decrypts the output data received from the transfer destination if this is encrypted. Reference numeral 551 is a PID regeneration circuit that extracts PID from the output data received from the transfer destination. Reference numeral 552 is protection signal detection means, connected to the transfer controller 3 and the read buffer memory 21 and detects a protection signal from the output data from the transfer destination and sets encryption mode. Reference numeral 553 is second authentication means and connected to the transfer controller. Suppose the protection signal is the same as that in Table 1 and encryption mode information is the same as that in Table 2.

The operation of the data transfer apparatus and data transfer system of the present embodiment configured as shown above will be explained below.

The protection signal regeneration means 552 extracts a protection signal from data output from the transfer destination and sets the data in the decryption means 550. The decryption means decrypts the data according to the protection signal described above. If the output data from the transfer destination is a plurality of programs multiplexed in packets and encrypted for every program, the PID regeneration circuit 551 detects PID and sets the PID in the decryption means 550. The decryption means only decrypts programs with the set PID.

The other operations are the same as those in Embodiment 2.

As shown above, if the output data from the transfer destination is encrypted, Embodiment 11 of the present invention can decrypt the data according to the protection signal and if the data is multiplexed data resulting from multiplexing a plurality of programs, the present embodiment has an advantage of selectively decrypting the data.

Meanwhile in Embodiments 1 to 11 described above, the explanations were made by centering on the data transfer apparatus and data transfer system of the present invention and the program recording medium of the present invention is a recording medium that stores a program that commands a computer to execute all or some of functions of components such as the means, controllers, memories or the like explained above.

The present embodiment implements the means and circuits, etc., by hardware, but the present embodiment is not limited to this; these means and circuits, etc. can also be implemented by software using a computer.

As described above, the present invention according to claims 1 to 3 can provide a data transfer apparatus that prevents continuous input/output data from being interrupted even if the interval at which a bus access enable is issued becomes irregular.

The present invention according to claims 4 and 5 can provide a data transfer apparatus that can further prevent illegal copies of transfer data requiring copyright protection in addition to the effect of preventing interruptions of continuous input/output data.

The present invention according to claim 6 can provide a data transfer apparatus that can further prevent illegal copies of transfer data requiring copyright protection through authentication in addition to the effect of preventing interruptions of continuous input/output data.

The present invention according to claim 7 can send encryption mode information, and thus transmit transfer data copy enable/disable information to the transfer destination in addition to the effect of preventing interruptions of continuous input/output data.

The present invention according to claim 8 can perform encryption for every program, and thus efficiently transmit data to be encrypted, multiplexed with data not requiring encryption from the transfer apparatus to the transfer destination in addition to the effect of preventing interruptions of continuous input/output data.

The present invention according to claim 9 can send PID without encryption, and thus the transfer destination can extract the packets of a predetermined program regardless of whether the data is encrypted or not.

The present invention according to claim 10 can perform encryption for every program and also attach encryption mode information for every program, and thus can set copy enable/disable information of transfer data for every program, in addition to the effect of preventing interruptions of continuous input/output data.

The present invention according to claim 11 can provide a data transfer system that can prevent interruptions of continuous input/output data even if the interval of issuing bus access enables becomes irregular.

The present invention according to claim 12 can provide a data transfer system that can completely prevent continuous input/output data from being interrupted due to irregular interval of issuing bus access enables for causes other than external causes such as errors.

The present invention according to claim 13 can provide a data transfer system that prevents omissions of continuously input data or interruptions of continuously output data caused by switching between an input data transfer and output data transfer.

The present invention according to claim 14 can provide a data transfer system that prevents interruptions of continuously output data caused by switching between a transfer of a continuous video data group and transfer of a continuous voice data group.

The present invention according to claims 15 to 18 can provide a data transfer system that can prevent illegal copies of transfer data requiring copyright protection in addition to the effect of preventing interruptions of continuous data.

What is claimed is:

1. A data transfer apparatus temporarily storing continuously input data and transmitting the input data to a transfer destination according to an input enable signal issued by said transfer destination through a first bus, comprising:

an input buffer memory that temporarily stores said continuously input data;

a transfer controller, connected with said transfer destination through said first bus, that acquires said input enable signal through said first bus and transmits said temporarily stored input data output from said input buffer memory to said transfer destination through said first bus;

a second bus that performs data transfer between said input buffer memory and said transfer controller; and a buffer controller that controls the output of said input buffer memory according to said input enable signal, wherein said input buffer memory has a capacity CAPW that satisfies the following Mathematical formula 1, formula: $CAPW \geq TW \times T1$ where the input rate of said continuously input data is T1 and the maximum assumed value of the transmission time interval of said input enable signal issued by said transfer destination is TW.

2. A data transfer apparatus temporarily storing output data transmitted from a transfer destination through a first bus according to an output enable signal issued by said transfer destination and continuously outputs the data, comprising:

a transfer controller connected with said transfer destination through said first bus that acquires said output enable signal and said transmitted output data through said first bus;

an output buffer memory that temporarily stores and continuously outputs said transmitted output data;

a second bus that performs data transfer between said output buffer memory and said transfer controller; and a buffer controller that controls the input to said output buffer memory according to said output enable signal, wherein said output buffer memory has a capacity CAPR that satisfies the following formula: $CAPR \geq TR \times T2$, where the output rate of said continuously output data is T2 and the maximum assumed value of the transmission time interval of said output enable signal issued by said transfer destination is TR.

3. A data transfer apparatus temporarily storing continuously input data, transmitting the input data to a transfer destination through a first bus according to an input enable signal issued by said transfer destination and temporarily storing output data transmitted from said transfer destination through the first bus according to an output enable signal issued by said transfer destination and continuously outputs the output data, comprising:

an input buffer memory that temporarily stores said continuously input data;

an output buffer memory that temporarily stores and continuously outputs said transmitted output data;

a transfer controller, connected with said transfer destination through said first bus, that acquires said input enable signal, said output enable signal and said transmitted output data through said first bus, transmits said temporarily stored input data output from said input buffer memory to said transfer destination through said first bus and transmits said output data to said output buffer memory through said first bus;

a second bus that performs data transfer between said input buffer memory, said output buffer memory and said transfer controller; and a buffer controller that controls the output of said input buffer memory according to said input enable signal and controls the input to said output buffer memory according to said output enable signal, wherein said input buffer memory has a capacity CAPW that satisfies the following formula: $CAPW \geq TW \times T1$, where the input rate of said continuously input data is T1 and the maximum assumed value of the transmission time interval of said input enable signal issued by said transfer destination is TW; and said output buffer memory has a capacity CAPR that satisfies the following formula: $CAPR \geq TR \times T2$, where the output rate of said continuously output data is T2 and the maximum assumed value of the transmission time interval of said output enable signal issued by said transfer destination is TR.

4. The data transfer apparatus according to claim 1, further comprising transfer control means on the apparatus side that detects whether said input data contains a predetermined protection signal, extracts the protection signal and enables transmission to said transfer destination according to the presence/absence of said protection signal or said protection signal.

5. The data transfer apparatus according to claim 3, further comprising transfer control means on the apparatus side that detects whether said input data contains a predetermined protection signal, extracts the protection signal and enables transmission to said transfer destination according to the presence/absence of said protection signal or said protection signal.

6. The data transfer apparatus according to claim 1, further comprising encryption means that detects whether said input data contains a predetermined protection signal and if said input data contains said predetermined protection signal, encrypts said input data and transmits the encrypted input data to said transfer destination.

7. The data transfer apparatus according to claim 3, further comprising encryption means that detects whether said input data contains a predetermined protection signal and if said input data contains said predetermined protection signal, encrypts said input data and transmits the encrypted input data to said transfer destination.

8. The data transfer apparatus according to claim 4, further comprising authentication means that, if authentication of said data transfer destination is considered necessary, said authentication is performed.

9. The data transfer apparatus according to claim 5, further comprising authentication means that, if authentication of said data transfer destination is considered necessary, said authentication is performed.

10. The data transfer apparatus according to claim 4, comprising said transfer controller that transmits not only data obtained by encrypting said input data, but also encryption mode information without encryption set according to said protection signal.

11. The data transfer apparatus according to claim 5, comprising said transfer controller that transmits not only data obtained by encrypting said input data, but also encryption mode information without encryption set according to said protection signal.

12. The data transfer apparatus according to claim 6, further comprising encryption means in which said input data is multiplexed data obtained by multiplexing a plurality of programs in a packet, selectively encrypted for every said program and transmitted to said transfer destination.

13. The data transfer apparatus according to claim 7, further comprising encryption means in which said input data is multiplexed data obtained by multiplexing a plurality of programs in a packet, selectively encrypted for every said program and transmitted to said transfer destination.

14. The data transfer apparatus according to claim 12, comprising said transfer controller that transmits packet identifiers to identify said plurality of programs without encryption to said transfer destination.

15. The data transfer apparatus according to claim 13, comprising said transfer controller that transmits packet identifiers to identify said plurality of program without encryption to said transfer destination.

16. The data transfer apparatus according to claim 12, comprising said transfer controller that transmits data with said encryption mode information for every said program of said multiplexed packet data.

17. The data transfer apparatus according to claim 13, comprising said transfer controller that transmits data with said encryption mode information for every said program of said multiplexed packet data.

18. A data transfer system comprising:
a data transfer apparatus according to claim 1;
a main memory and a central processing unit that controls the main memory comprising said transfer destination; and
a transfer bus, which is said first bus.

19. A data transfer system comprising:
a data transfer apparatus according to claim 2;
a main memory and a central processing unit that controls the main memory comprising said transfer destination; and
a transfer bus, which is said first bus.

20. A data transfer system comprising:
a data transfer apparatus according to claim 3;
a main memory and a central processing unit that controls the main memory comprising said transfer destination; and
a transfer bus, which is said first bus.

21. The data transfer system according to claim 18, wherein said central processing unit sets the transfer size corresponding to said input enable signal in such a way that said input buffer memory becomes empty when a transfer is completed and/or sets the transfer size corresponding to said output enable signal in such a way that said output buffer memory is left without empty space when the transfer is completed.

22. The data transfer system according to claim 19, wherein said central processing unit sets the transfer size corresponding to said input enable signal in such a way that said input buffer memory becomes empty when a transfer is completed and/or sets the transfer size corresponding to said output enable signal in such a way that said output buffer memory is left without empty space when the transfer is completed.

23. The data transfer system according to claim 20, wherein said central processing unit sets the transfer size corresponding to said input enable signal in such a way that said input buffer memory becomes empty when a transfer is completed and/or sets the transfer size corresponding to said output enable signal in such a way that said output buffer memory is left without empty space when the transfer is completed.

24. The data transfer system according to claim 18, wherein said data transfer apparatus is the data transfer apparatus according to claim 3 and comprises transfer control means that switches between said input data transfer and said output data transfer by means of time division according to a relationship between said input buffer memory capacity, said input rate, capacity of said output buffer memory and said output rate, and said input enable signal and said output enable signal are issued according to switching performed by said transfer control means.

25. The data transfer system according to claim 19, wherein said data transfer apparatus is the data transfer apparatus according to claim 3 and comprises transfer control means that switches between said input data transfer and said output data transfer by means of time division according to a relationship between said input buffer memory capacity, said input rate, capacity of said output buffer memory and said output rate, and said input enable signal and said output enable signal are issued according to switching performed by said transfer control means.

26. The data transfer system according to claim 20, wherein said data transfer apparatus is the data transfer apparatus according to claim 3 and comprises transfer control means that switches between said input data transfer and said output data transfer by means of time division according to a relationship between said input buffer memory capacity, said input rate, capacity of said output buffer memory and said output rate, and said input enable signal and said output enable signal are issued according to switching performed by said transfer control means.

27. The data transfer system according to claim 18, wherein said data transfer apparatus is the data transfer apparatus according to claim 2 or 3, and
if said output data is obtained by separating video/voice multiplexed data into a continuous video data group, which is a group of continuous video data and a continuous voice data group, which is a group of continuous voice data,
said continuous video data group and said continuous voice data group, which are mutually corresponding to each other, are transmitted in response to said two output enable signals issued one after the other, respectively,
the transfer timings of said two output enable signals are determined by the transfer control means in such a way that said continuous video data group and said continuous voice data group, which are mutually corresponding to each other, are output from said output buffer memory continuously.

28. The data transfer system according to claim 19, wherein said data transfer apparatus is the data transfer apparatus according to claim 2 or 3, and if said output data is obtained by separating video/voice multiplexed data into a continuous video data group, which is a group of continuous video data and a continuous voice data group, which is a group of continuous voice data, said continuous video data group and said continuous voice data group, which are mutually corresponding to each other, are transmitted in response to said two output enable signals issued one after the other, respectively, the transfer timings of said two output enable signals are determined by the transfer control means in such a way that said continuous video data group and said continuous voice data group, which are mutually corresponding to each other, are output from said output buffer memory continuously.

29. The data transfer system according to claim 20, wherein said data transfer apparatus is the data transfer apparatus according to claim 2 or 3, and if said output data is obtained by separating video/voice multiplexed data into a continuous video data group, which is a group of continuous video data and a continuous voice data group, which is a group of continuous voice data, said continuous video data group and said continuous voice data group, which are mutually corresponding to each other, are transmitted in response to said two output enable signals issued one after the other, respectively, the transfer timings of said two output enable signals are determined by the transfer control means in such a way that said continuous video data group and said continuous voice data group, which are mutually corresponding to each other, are output from said output buffer memory continuously.

30. The data transfer system according to claim 18, wherein said data transfer apparatus is the data transfer apparatus according to claim 2 or 3 and comprises transfer control means on the transfer destination side that detects whether said output data contains a predetermined protection signal and enables transmission to said data transfer apparatus according to said protection signal.

31. The data transfer system according to claim 19, wherein said data transfer apparatus is the data transfer apparatus according to claim 2 or 3 and comprises transfer control means on the transfer destination side that detects whether said output data contains a predetermined protection signal and enables transmission to said data transfer apparatus according to said protection signal.

32. The data transfer system according to claim 20, wherein said data transfer apparatus is the data transfer apparatus according to claim 2 or 3 and comprises transfer control means on the transfer destination side that detects whether said output data contains a predetermined protection signal and enables transmission to said data transfer apparatus according to said protection signal.

33. The data transfer system according to claim 18, wherein said data transfer apparatus is the data transfer apparatus according to claim 2 or 3, comprising transfer control means on the transfer destination side that, if said output data is encrypted, detects whether said output data contains predetermined encryption mode information or not, carries out authentication on said data transfer apparatus according to said encryption mode information and enables transmission to said data transfer apparatus only when said data transfer apparatus is authenticated.

34. The data transfer system according to claim 19, wherein said data transfer apparatus is the data transfer apparatus according to claim 2 or 3, comprising transfer control means on the transfer destination side that, if said output data is encrypted, detects whether said output data contains predetermined encryption mode information or not, carries out authentication on said data transfer apparatus according to said encryption mode information and enables transmission to said data transfer apparatus only when said data transfer apparatus is authenticated.

35. The data transfer system according to claim, 20, wherein said data transfer apparatus is the data transfer apparatus according to claim 2 or 3, comprising transfer control means on the transfer destination side that, if said output data is encrypted, detects whether said output data contains predetermined encryption mode information or not, carries out authentication on said data transfer apparatus according to said encryption mode information and enables transmission to said data transfer apparatus only when said data transfer apparatus is authenticated.

36. The data transfer apparatus according to claim 2, further comprising, authentication means that if said output data is encrypted and contains predetermined encryption mode information carries out necessary authentication on said transfer destination according to said predetermined encryption mode information and decryption means that decrypts said encrypted output data.

37. The data transfer apparatus according to claim 36, comprising, authentication means that if said output data contains multiplexed data made up of a plurality of programs multiplexed into packets and then encrypted and predetermined encryption mode information carries out necessary authentication on said transfer destination according to said predetermined encryption mode information and decryption means that selectively decrypts said encrypted output data for every said program.

38. A program recording medium storing a program that commands a computer to execute all or some of functions demonstrated by each means or each component of the data transfer apparatus or data transfer system according to claim 1.

39. A program recording medium storing a program that commands a computer to execute all or some of functions demonstrated by each means or each component of the data transfer apparatus or data transfer system according to claim 2.

40. A program recording medium storing a program that commands a computer to execute all or some of functions demonstrated by each means or each component of the data transfer apparatus or data transfer system according to claim 3.

* * * * *

UNITED STATES PATENT AND TRADEMARK OFFICE
CERTIFICATE OF CORRECTION

PATENT NO. : 6,460,095 B1
DATED : March 19, 2003
INVENTOR(S) : Takafumi Ueno et al.

It is certified that error appears in the above-identified patent and that said Letters Patent is hereby corrected as shown below:

<u>Title page,</u>
Item [30], Foreign Application Priority Data, change "JP 10-170016" to
-- JP 11-170016 --.

Signed and Sealed this

Fifteenth Day of April, 2003

JAMES E. ROGAN
*Director of the United States Patent and Trademark Office*